US012794917B2

(12) United States Patent
White et al.

(10) Patent No.: US 12,794,917 B2
(45) Date of Patent: Nov. 10, 2026

(54) DEVICES, SYSTEMS, AND METHODS FOR STREAMLINING AND STANDARDIZING THE INGEST OF SECURITY DATA ACROSS MULTIPLE TENANTS

(71) Applicant: BlueVoyant LLC, New York, NY (US)

(72) Inventors: Chris White, New York, NY (US); Jake Vance, New York, NY (US); Allen Duet, New York, NY (US); Ed Schernau, New York, NY (US); Neel Arora, New York, NY (US); Chris Surel, New York, NY (US)

(73) Assignee: BlueVoyant LLC, New York, NY (US)

( * ) Notice: Subject to any disclaimer, the term of this patent is extended or adjusted under 35 U.S.C. 154(b) by 23 days.

(21) Appl. No.: 18/725,988

(22) PCT Filed: Dec. 21, 2022

(86) PCT No.: PCT/US2022/082173
§ 371 (c)(1),
(2) Date: Jul. 1, 2024

(87) PCT Pub. No.: WO2023/129852
PCT Pub. Date: Jul. 6, 2023

(65) Prior Publication Data

US 2025/0097244 A1 Mar. 20, 2025

Related U.S. Application Data

(60) Provisional application No. 63/295,150, filed on Dec. 30, 2021.

(51) Int. Cl.

| | |
|---|---|
| ***H04L 9/40*** | (2022.01) |
| ***H04L 9/08*** | (2006.01) |
| ***H04L 65/102*** | (2022.01) |

(52) U.S. Cl.
CPC ........ *H04L 63/1425* (2013.01); *H04L 9/0894* (2013.01); *H04L 65/102* (2013.01); *H04L 63/0263* (2013.01)

(58) Field of Classification Search
CPC ............... H04L 9/0894; H04L 63/0263; H04L 63/1425; H04L 65/102
See application file for complete search history.

(56) References Cited

U.S. PATENT DOCUMENTS 12,093,286 B2 * 9/2024 Valt ....................... G06F 16/278
2016/0248792 A1 * 8/2016 Tidwell .............. G06F 16/2455
(Continued)

FOREIGN PATENT DOCUMENTS

WO 2023129852 A1 7/2023

OTHER PUBLICATIONS

International Search Report and Written Opinion for corresponding PCT Application No. PCT/US2022/082173, mailed Mar. 29, 2023.
(Continued)

*Primary Examiner* — Thomas J Dailey
(74) *Attorney, Agent, or Firm* — K&L Gates LLP

(57) ABSTRACT

A method for streamlining and standardizing the ingest of security data across a plurality of tenant networks is disclosed. Each of the plurality of tenant networks comprises at least one log source, the method comprising receiving, by each of a plurality of data gateway modules, raw log data from the log source associated therewith; generating, by each of the plurality of data gateway modules, formatted log data based on the raw log data; ingesting, by an edge module, formatted log data from the plurality of data gateway modules; automatically updating, by a central control plane module, a configuration of at least one of the plurality of data gateway modules based on a change to the log source(s) associated therewith; and implementing, by a
(Continued)

security monitoring system, a security action related to at least one of the plurality of tenant networks based on the ingested formatted data.

29 Claims, 8 Drawing Sheets

(56) References Cited

U.S. PATENT DOCUMENTS

| | | | | |
|---|---|---|---|---|
| 2017/0251003 | A1 | 8/2017 | Rostami-Hesarsorkh et al. | |
| 2018/0027006 | A1 | 1/2018 | Zummermann et al. | |
| 2019/0158524 | A1 | 5/2019 | Zadeh et al. | |
| 2019/0268357 | A1 | 8/2019 | Rostamabadi et al. | |
| 2020/0128047 | A1 | 4/2020 | Biswas et al. | |
| 2021/0117232 | A1 | 4/2021 | Sriharsha et al. | |
| 2022/0253534 | A1* | 8/2022 | Biswas ................. | G06F 21/577 |
| 2022/0294816 | A1* | 9/2022 | Martin .................. | H04L 67/535 |

OTHER PUBLICATIONS

Extended European Search Report for corresponding European Application No. 22917472.7 mailed Mar. 5, 2025.

* cited by examiner

DEVICES, SYSTEMS, AND METHODS FOR STREAMLINING AND STANDARDIZING THE INGEST OF SECURITY DATA ACROSS MULTIPLE TENANTS

CROSS-REFERENCE TO RELATED APPLICATIONS

This application is a U.S. National Stage Entry under 35 U.S.C. § 371 of International Patent Application No. PCT/US2022/082173, entitled "DEVICES, SYSTEMS, AND METHODS FOR STREAMLINING AND STANDARDIZING THE INGEST OF SECURITY DATA ACROSS MULTIPLE TENANTS," filed Dec. 21, 2022, which claims benefit under 35 U.S.C. § 119(e) to U.S. Provisional Application No. 63/295,150, filed Dec. 30, 2021, entitled "DEVICES, SYSTEMS, AND METHODS FOR STREAMLINING AND STANDARDIZING THE INGEST OF SECURITY DATA ACROSS MULTIPLE TENANTS," the entire disclosure(s) of which are hereby incorporated by reference herein.

FIELD

The present disclosure is generally related to network security, and, more particularly, is directed to improved devices, systems, and methods for streamlining and standardizing the ingest of data across multiple tenants.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a method for streamlining and standardizing the ingest of data in a security monitoring system across a plurality of tenant networks is disclosed. In one aspect, the security monitoring system comprises an edge module, a central control plane module, and a plurality of data gateway modules, wherein each of the plurality of data gateway modules is associated with a different log source, and wherein each of the plurality of tenant networks comprises at least one log source. In another aspect, the method comprises receiving, by each of the plurality of data gateway modules of the security monitoring system, raw log data from the log source associated therewith; generating, by each of the plurality of data gateway modules of the security monitoring system, formatted log data based on the raw log data; ingesting, by the edge module of the security monitoring system, formatted log data from the plurality of data gateway modules; automatically updating, by the central control plane module of the security monitoring system, a configuration of at least one of the plurality of data gateway modules based on a change to the log source(s) associated therewith; and implementing, by the security monitoring system, a security action related to at least one of the plurality of tenant networks based on the ingested formatted data.

In various aspects, a security monitoring system capable of streamlining and standardizing the ingest of data across a plurality of tenant networks, each of the plurality of tenant networks comprising at least one log source, is disclosed. In one aspect, the security monitoring system comprises a plurality of data gateway modules, each of the plurality of data gateway modules associated with a different log source, each of the plurality of data gateway modules configured to receive raw log data from the log source associated therewith; and generate formatted log data based on the raw log data; an edge module configured to ingest the formatted log data from the plurality of data gateway modules; and a central control plane module configured to: automatically update the configuration of at least one of the plurality of gateway modules in response to a change to the log source(s) associated therewith; wherein the security monitoring system is configured to implement a security action related to at least one of the plurality of tenant networks based on the ingested formatted data.

In various aspects, a system for streamlining and standardizing the ingest of security data is disclosed. In one aspect, the system comprises a plurality of tenant networks, each of the plurality of tenant networks comprising at least one log source; and a security monitoring subsystem comprising a plurality of data gateway modules, each of the plurality of data gateway modules associated with a different log source, each of the plurality of data gateway modules configured to: receive raw log data from the log source associated therewith; and generate formatted log data based on the raw log data; an edge module configured to ingest the formatted log data from the plurality of data gateway modules; and a central control plane module configured to: automatically update the configuration of at least one of the plurality of gateway modules in response to a change to the log source(s) associated therewith; wherein the security monitoring subsystem is configured to implement a security action related to at least one of the plurality of tenant networks based on the ingested formatted data.

These, and other objects, features, and characteristics of the present disclosure, as well as the methods of operation, and functions of the related elements of structure, and the combination of parts, and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration, and description only, and are not intended as a definition of the limits of the present disclosure.

BRIEF DESCRIPTION OF THE DRAWINGS

Various features of the aspects described herein are set forth with particularity in the appended claims. The various aspects, however, both as to organization, and methods of operation, together with advantages thereof, may be understood in accordance with the following description taken in conjunction with the accompanying drawings as follows:

Figure 1:
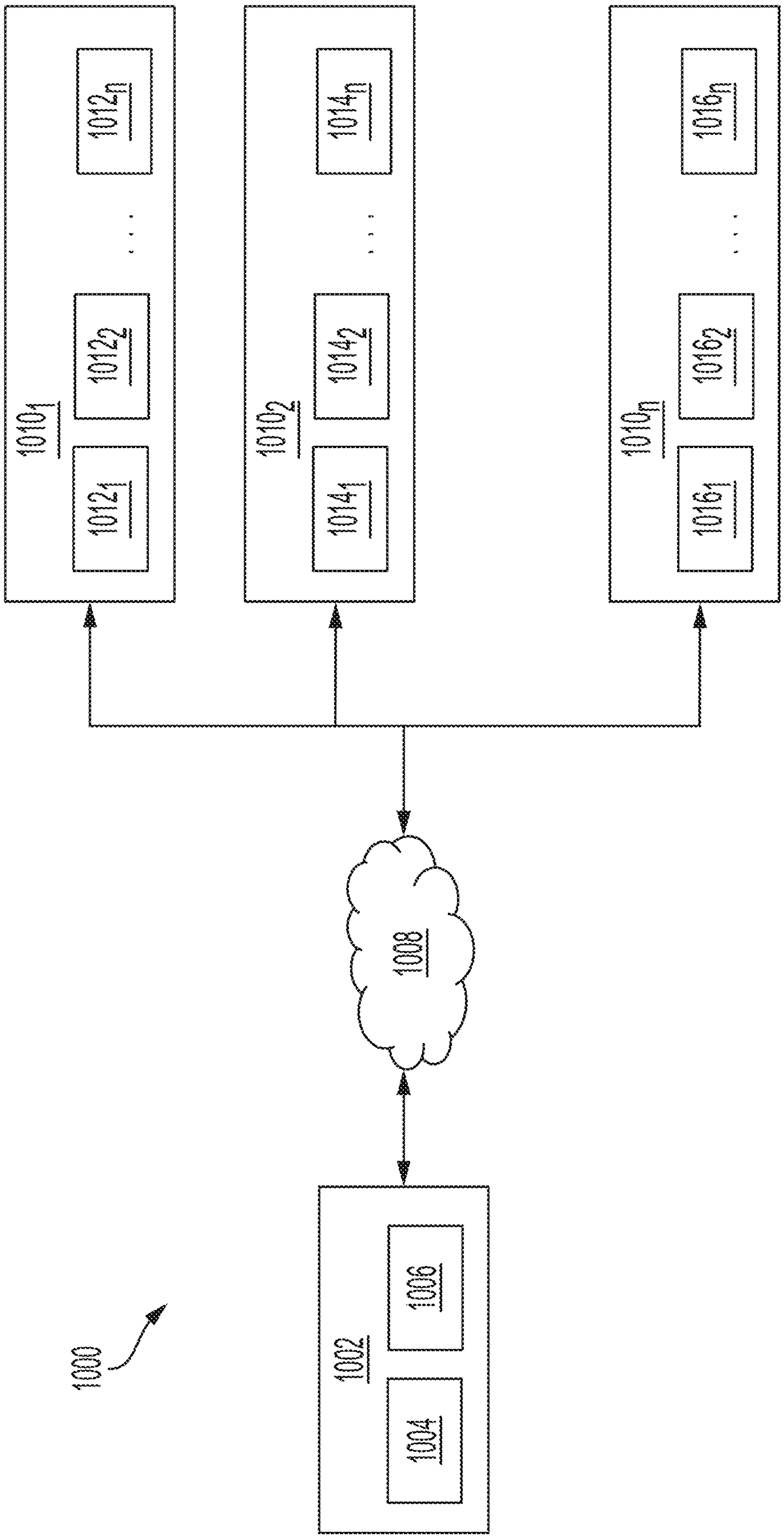
FIG. 1 illustrates a diagram of a system configured for Security Information, and Event Management (SIEM) implementation across multiple tenants, in accordance with at least one non-limiting aspect of the present disclosure.

Corresponding reference characters indicate corresponding parts throughout the several views. The exemplifications set out herein illustrate various aspects of the present disclosure, in one form, and such exemplifications are not to be construed as limiting the scope of the present disclosure in any manner.

DETAILED DESCRIPTION

The Applicant of the present application owns the following Patent Applications, the disclosure of each of which is herein incorporated by reference in its entirety:

- U.S. Provisional Patent Application No. 63/196,458 titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed on Jun. 3, 2021;
- U.S. Provisional Patent Application No. 63/196,991, titled DEVICES, SYSTEMS, AND METHODS FOR STANDARDIZING & STREAMLINING THE DEPLOYMENT OF SECURITY INFORMATION & EVENT MANAGEMENT ARTIFACTS FOR MULTIPLE TENANTS, filed on Jun. 4, 2021;
- U.S. Provisional Patent Application No. 63/294,570 titled DEVICES, SYSTEMS, AND METHODS FOR PROVISIONING AND UPDATING SECURITY INFORMATION & EVENT MANAGEMENT ARTIFACTS FOR MULTIPLE TENANTS, filed on Dec. 29, 2021;
- U.S. Provisional Patent Application No. 63/295,150 titled DEVICES, SYSTEMS, AND METHODS FOR STREAMLINING AND STANDARDIZING THE INGEST OF SECURITY DATA ACROSS MULTIPLE TENANTS, filed on Dec. 30, 2021;
- U.S. Provisional Patent Application No. 63/302,828 titled DEVICES, SYSTEMS, AND METHODS FOR REMOTELY MANAGING ANOTHER ORGANIZATION'S SECURITY ORCHESTRATION, AUTOMATION, AND RESPONSE, filed on Jan. 25, 2022;
- U.S. Provisional Patent Application No. 63/313,422 titled DEVICES, SYSTEMS, AND METHODS FOR IDENTIFYING CYBER ASSETS AND GENERATING CYBER RISK MITIGATION ACTION BASED ON DOMAIN REDIRECTS, filed on Feb. 24, 2022;
- U.S. Provisional Patent Application No. 63/341,264 titled DEVICES, SYSTEMS, AND METHODS FOR SUMMARIZING ANALYTIC OBSERVATIONS, filed on May 12, 2022;
- U.S. Provisional Patent Application No. 63/344,305 titled DEVICES, SYSTEMS, AND METHODS FOR INGESTING & ENRICHING SECURITY INFORMATION TO AUTONOMOUSLY SECURE A PLURALITY OF TENANT NETWORKS, filed on May 20, 202;
- U.S. Provisional Patent Application No. 63/345,679 titled DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM, filed on May 25, 2022;
- International Patent Application No. PCT/US22/72739, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed on Jun. 3, 2022;
- International Patent Application No. PCT/US22/72743, titled DEVICES, SYSTEMS, AND METHODS FOR STANDARDIZING & STREAMLINING THE DEPLOYMENT OF SECURITY INFORMATION & EVENT MANAGEMENT ARTIFACTS FOR MULTIPLE TENANTS, filed on Jun. 3, 2022;
- U.S. Provisional Patent Application No. 63/365,819 titled DEVICES, METHODS, AND SYSTEMS FOR GENERATING A HIGHLY-SCALABLE, EFFICIENT COMPOSITE RECORD INDEX, filed on Jun. 3, 2022
- U.S. Provisional Patent Application No. 63/353,992 titled DEVICES, SYSTEMS, AND METHODS FOR CATEGORIZING, PRIORITIZING, AND MITIGATING CYBER SECURITY RISKS, filed on Jun. 21, 2022;
- U.S. Provisional Patent Application No. 63/366,903 titled DEVICES, SYSTEMS, AND METHOD FOR GENERATING AND USING A QUERYABLE INDEX IN A CYBER DATA MODEL TO ENHANCE NETWORK SECURITY, filed on Jun. 23, 2022;
- U.S. Provisional Patent Application No. 63/368,567 titled DEVICES, SYSTEMS, AND METHODS FOR UTILIZING A NETWORKED, COMPUTER-ASSISTED, THREAT HUNTING PLATFORM TO ENHANCE NETWORK SECURITY, filed on Jul. 15, 2022;
- U.S. Provisional Patent Application No. 63/369,582 titled AUTONOMOUS THREAT SCORING AND SECURITY ENHANCEMENT, filed on Jul. 27, 2022; and
- U.S. Provisional Patent Application No. 63/377,304, titled DEVICES, SYSTEMS, AND METHODS FOR CONTINUOUSLY ENHANCING THE IMPLEMENTATION OF CODE CHANGES VIA ENRICHED PIPELINES, filed on Sep. 27, 2022.

Numerous specific details are set forth to provide a thorough understanding of the overall structure, function, manufacture, and use of the aspects as described in the disclosure, and illustrated in the accompanying drawings. Well-known operations, components, and elements have not been described in detail so as not to obscure the aspects described in the specification. The reader will understand that the aspects described, and illustrated herein are non-limiting aspects, and thus it can be appreciated that the specific structural, and functional details disclosed herein may be representative, and illustrative. Variations, and changes thereto may be made without departing from the scope of the claims.

Before explaining various aspects of the systems, and methods disclosed herein in detail, it should be noted that the illustrative aspects are not limited in application or use to the details of disclosed in the accompanying drawings, and description. It shall be appreciated that the illustrative aspects may be implemented or incorporated in other aspects, variations, and modifications, and may be practiced or carried out in various ways. Further, unless otherwise indicated, the terms, and expressions employed herein have been chosen for the purpose of describing the illustrative aspects for the convenience of the reader, and are not for the purpose of limitation thereof. For example, it shall be appreciated that any reference to a specific manufacturer, software suite, application, or development platform disclosed herein is merely intended to illustrate several of the many aspects of the present disclosure. This includes any, and all references to trademarks. Accordingly, it shall be appreciated that the devices, systems, and methods disclosed herein can be implemented to enhance any software update, in accordance with any intended use, and/or user preference.

As used herein, the term "server" may refer to or include one or more computing devices that are operated by or facilitate communication, and processing for multiple parties in a network environment, such as the Internet or any public or private network. Reference to "a server" or "a processor," as used herein, may refer to a previously-recited server, and/or processor that is recited as performing a previous step or function, a different server, and/or processor, and/or a combination of servers, and/or processors.

As used herein, the term "network" may refer to or include an entire enterprise information technology ("IT") system, as deployed by a tenant. For example, a network can include a group of two or more nodes (e.g., assets) connected by any physical and/or wireless connection and configured to communicate and share information with the other node or nodes. However, the term network shall not be limited to any particular nodes or any particular means of connecting those nodes. A network can include any combination of assets (e.g., devices, servers, desktop computers, laptop computers, personal digital assistants, mobile phones, wearables, smart appliances, etc.) configured to connect to an ethernet, intranet, and/or extranet and communicate with one another via an ad hoc connection (e.g., Bluetooth®, near field communication ("NFC"), etc.), a local area connection ("LAN"), a wireless local area network ("WLAN"), and/or a virtual private network ("VPN"), regardless of each devices' physical location. A network can further include any tools, applications, and/or services deployed by devices, or otherwise utilized by an enterprise IT system, such as a firewall, an email client, document management systems, office systems, etc. In some non-limiting aspects, a "network" can include third-party devices, applications, and/or services that, although they are owned and controlled by a third party, are authorized by the tenant to access the enterprise IT system.

As used herein, the term "platform" can include software architectures, hardware architectures, and/or combinations thereof. A platform can include either a stand-alone software product, a network architecture, and/or a software product configured to integrate within a software architecture and/or a hardware architecture, as required for the software product to provide its technological benefit. For example, a platform can include any combination of a chipset, a processor, a logic-based device, a memory, a storage, a graphical user interface, a graphics subsystem, an application, and/or a communication module (e.g., a transceiver). In other words, a platform can provide the resources required to enable the technological benefits provided by software. According to some non-limiting aspects, the technological benefit provided by the software is provided to the physical resources of the ecosystem or other software employed by physical resources within the ecosystem (e.g., APIs, services, etc.). According to other non-limiting aspects, a platform can include a framework of several software applications intended and designed to work together.

As used herein, the term "Security Monitoring Platform" may refer to or include software configured to aggregate and analyze activity from many different resources across an entire information technology (IT) infrastructure. For example, a Security Monitoring Platform can include a Security Information and Event Management (SIEM) platform and/or other types of platforms used to monitor and/or analyze data (e.g., Slpunk Enterprise Security, Microsoft Sentinel, Datadog Security Monitoring, ELK, etc.). The various aspects of the devices, systems, and methods disclosed herein as they relate to SIEM can similarly apply to any type of Security Monitoring Platform.

SIEM can be implemented to aggregate data (e.g., log data, event data, threat intelligence data, etc.) from multiple platforms, and analyze that data to catch abnormal behavior or potential cyberattacks. SIEM may collect security data from network devices, servers, domain controllers, and more. SIEM can be implemented to store, normalize, aggregate, and apply analytics to that data to discover trends, detect threats, and enable organizations to investigate any alerts. Although known SIEM tools (also referred to herein as SIEM detection engines) offer impressive functionality, including the ability to monitor events, collect data, and issue security alerts across a network, such tools are typically tailored for an implementing organization, and—more specifically—a particular network architecture, which can oftentimes be complex.

In one specific aspect, implementing SIEM tools and other Security Monitoring Platforms can be complex due to the variety of data sources that may be comprised within a particular organization's network architecture. This variety of data sources can result from organizations employing various combinations of on-premises and cloud-based data logging tools to collect, aggregate, and forward data from within a network. For example, a given network may employ on-premises data logging tools such as, for example, SysLog forwarding, Windows Event forwarding, Filebeat forwarding, or other commercial available software for data logging and forwarding. Additionally, organizations may utilize cloud-based data services, such as, for example, Amazon Web Services (AWS), Microsoft 365, Okta, or other cloud-based data services for collecting and aggregating data logs. The SIEM tool must be capable of ingesting log data from these various sources in order to utilize the data to detect security-related events and trends. However, the data generated by each type of log source can have different characteristics, such as, for example, a different format or a different organization of content. Thus, deploying the SIEM tool typically requires customization based on the specific data log sources that are implement in a given network.

The customization required to deploy a SIEM tool, or any Security Monitoring Platform, can be especially time-consuming for a security service provider (MSSP) tasked with managing security across the networks of multiple clients (i.e., multiple tenants). For example, Splunk Enterprise Security (Splunk Cloud) is a popular, cloud-based SIEM detection engine that is often used by MSSPs. However, the deployment of Splunk Cloud across multiple tenants typically requires customization based on each tenant's specific combination of log sources. This customization requires a high level of skill, and, at the same time, it could be very time consuming, and error prone. Moreover, the data ingestion configuration for a particular tenant network may need to be updated every time the tenant updates, adds, removes, or otherwise changes a log source. Yet further, most cloud-based SIEM products, such as Splunk Cloud, can undergo various changes driven by the manufacturer, which can simultaneously impact all tenants and necessitate additional ingest configuration updates.

The customization required to handle the data ingest across multiple tenant networks can result in a high cost for both the MSSP—who must hire more expensive specialists—and for the tenant, who often bears at least a portion of the increasing expenses. However, there is often an overlap between some of the deployment needs of varying tenants. For example, many organizations may utilize one or more of the same types of data log sources. Thus, it may be useful to leverage common aspects across networks to implement a centralized system to manage the ingestion of a wide variety of different data types across multiple tenant networks. Unfortunately, known SIEM tools and other Security Monitoring Platforms are technologically incapable of leveraging such synergies. Thus, from the initial deployment, and throughout various SIEM- and log source-related updates, MSSPs are left with limited opportunities to capture efficiencies across multiple clients. Accordingly, there is a need for improved devices, systems, and methods for streamlining and standardizing the ingest of log data across multiple tenants. Such enhancements could improve the technological performance and cost effectiveness of SIEM tools and/or other Security Monitoring Platforms for MSSPs. For example, such enhancements could the reduce resources needed for the initial deployment of the SIEM tool and/or Security Monitoring Platform across multiple tenant networks. Additionally, such enhancements could significantly reduce human resources required to update the ingestion configuration in response to SIEM-, Security Monitoring Platform-, and/or log source-related updates.

The present disclosure presents such devices, systems, and methods for streamlining and standardizing the ingest of log data across multiple tenants, all of which provide many technological benefits. For example, the devices, systems, and methods disclosed herein can provide: (1) a reduction in the resources required for the initial deployment of a Security Monitoring Platform across multiple tenant networks, in a non-routine way, by using centrally-controlled data gateway modules that process various types of log data across multiple tenants networks into a standardized format for streamlined ingestion by an edge module; (2) a reduction in the human resources required to respond to log source changes by automatically updating data gateway module configurations; (3) an improvement over ingest configuration updates performed by human security analysts by simultaneously updating the configuration of a plurality of data gateway modules based on a common change to log sources across multiple tenant networks; and/or (4) a practical application through the implementation of a security action based on security-related events and trends detected in the ingested data.

Referring now to FIG. 1, a diagram of a system 1000 configured for SIEM implementation across multiple tenants is illustrated, in accordance with at least one non-limiting aspect of the present disclosure. The system 1000 can include a SIEM provider server 1002 comprising a memory 1004 and a processor 1006. In various aspects, SIEM provider server 1002 can comprise the computer system 9000 and the various components thereof (e.g., processor 1006 can be similar to processor(s) 9004, memory 1004 can be similar to main memory 9006, etc.), as will be discussed in further reference to FIG. 7. In various aspects, the memory 1004 may be configured to store instructions that, when executed by processor 1006, cause the generation of a central control plane module 200, data gateway modules 2101, 2102, $\mathbf{212_2}$, . . . $\mathbf{210_n}$, $\mathbf{212_n}$, and edge modules $\mathbf{220_1}$, . . . $\mathbf{220_n}$, $\mathbf{222_n}$, as will be discussed in further reference to FIG. 2. In various aspects, the SIEM provider server 1002 can be a computational resource either owned or leased by an MSSP. The SIEM provider server 1002 can be communicably coupled, via network 1008, to a plurality of tenants $\mathbf{1010_1}$, $\mathbf{1010_2}$ . . . $\mathbf{1010_n}$. Each tenant $\mathbf{1010_1}$, $\mathbf{1010_2}$ . . . $\mathbf{1010_n}$ of the plurality can represent a customer (e.g., organization) contracting with the MSSP for security services. According to a non-limiting aspect of FIG. 1, the network 1008 can include any variety of wired, long-range wireless, and/or short-range wireless networks. For example, the network 1008 can include an internal network, a Local Area Network (LAN), WiFi®, cellular networks, near-field communication (hereinafter "NFC"), amongst others.

In further reference to FIG. 1, each tenant $\mathbf{1010_1}$, $\mathbf{1010_2}$ . . . $\mathbf{1010_n}$ of the plurality can host one or more instances of one or more clients 1012, 1014, 1016. For example, a first tenant $\mathbf{1010_1}$ can include one or more machines implementing one or more client applications $\mathbf{1012_1}$, $\mathbf{1012_2}$ . . . $\mathbf{1012_n}$, a second tenant $\mathbf{1010_2}$ can include one or more machines implementing one or more client applications $\mathbf{1014_1}$, $\mathbf{1014_2}$ . . . $\mathbf{1014_n}$, and/or a third tenant $\mathbf{1010_n}$ can include one or more machines implementing one or more client applications $\mathbf{1016_1}$, $\mathbf{1016_2}$ . . . $\mathbf{1016_n}$. Each tenant $\mathbf{1010_1}$, $\mathbf{1010_2}$, . . . $\mathbf{1010_n}$ can include an intranet (i.e., network) by which each machine can communicate. As mentioned above, each tenant $\mathbf{1010_1}$, $\mathbf{1010_2}$, . . . $\mathbf{1010_n}$ can represent a customer, such as an organization, contracting with the MSSP for security services. Accordingly, the SIEM provider server 1002 can be configured to have oversight of each tenant $\mathbf{1010_1}$, $\mathbf{1010_2}$, and $\mathbf{1010_n}$ of the plurality, and thus, is responsible for monitoring, and managing each client application 1012, 1014, 1016 for threats.

As previously discussed, complexities of tenant $\mathbf{1010_1}$, $\mathbf{1010_2}$, . . . $\mathbf{1010_n}$ architectures, such as the different types of data log sources employed by each tenant, can complicate their management by the MSSP. For example, known SIEM detection engines can require costly and time consuming customization based on each tenant $\mathbf{1010_1}$, $\mathbf{1010_2}$, . . . $\mathbf{1010_n}$ architecture. According to non-limiting aspects of the present disclosure, the SIEM provider server 1002 can implement a central control plane module 200, data gateway modules $\mathbf{210_1}$, $\mathbf{210_2}$, $\mathbf{212_2}$, . . . $\mathbf{210_n}$, $\mathbf{212_n}$, and one or more edge modules $\mathbf{220_1}$, . . . $\mathbf{220_n}$, $\mathbf{222_n}$, as described below with respect to FIG. 2, to address these deficiencies in a non-conventional way to streamline and standardize the ingest of log data across tenants $\mathbf{1010_1}$, $\mathbf{1010_2}$, . . . $\mathbf{1010_n}$. Moreover, these enhancements can be practically applied to implement a security action based on security-related events and trends detected in the ingested data. For example, based on ingested data, the SIEM provider server 1002 can be configured to generate a security alert that is transmitted to an administrator of at least one of the tenants $\mathbf{1010_1}$, $\mathbf{1010_2}$, . . . $\mathbf{1010_n}$. As another example, based on the ingested data, the SIEM provider server 1002 can be configured to remove access to one of the tenant networks $\mathbf{1010_1}$, $\mathbf{1010_2}$, . . . $\mathbf{1010_n}$ from one or more client applications 1012, 1014, 1016.

Figure 2:
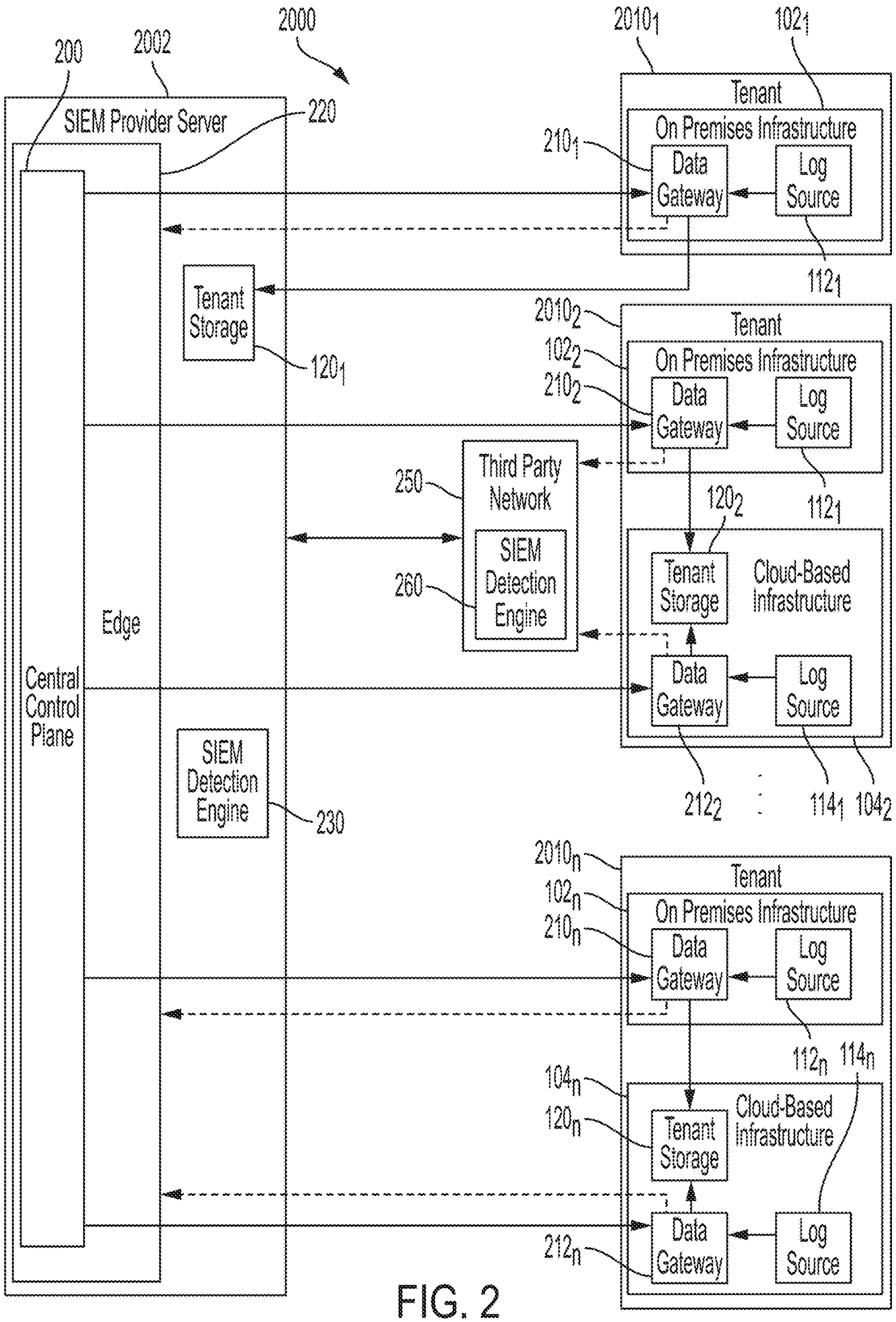
FIG. 2 illustrates a diagram of a system configured to streamline and standardize the ingest of log data across multiple tenants, in accordance with at least one non-limiting aspect of the present disclosure.

Referring now to FIG. 2, a diagram of a system 2000 configured to streamline and standardize the ingest of log data across multiple tenants is illustrated, in accordance with at least one non-limiting aspect of the present disclosure. The system 2000 can include a SIEM provider server 2002 and a plurality of tenants $\mathbf{2010_1}$, $\mathbf{2010_2}$ . . . $\mathbf{2010_n}$. In some aspects, the SIEM provider server 2002 can be similar to the SIEM provider server 1002 of FIG. 1. Likewise, the plurality of tenants $\mathbf{2010}_1$, $\mathbf{2010}_2$ . . . $\mathbf{2010}_n$ can be similar to the plurality of tenants $\mathbf{1010}_1$, $\mathbf{1010}_2$ . . . $\mathbf{1010}_n$ of FIG. 1. Thus, the SIEM provider server 2002 can be a computational resource (e.g., cloud infrastructure hosting environment) either owned or leased by an MSSP and each tenant $\mathbf{2010}_1$, $\mathbf{2010}_2$ . . . $\mathbf{2010}_n$ of the plurality can represent a network of a customer (e.g., organization) contracting with the MSSP for security services.

In further reference to FIG. 2, at least one of the tenants $\mathbf{2010}_1$, $\mathbf{2010}_2$ . . . $\mathbf{2010}_n$ can have an on-premises infrastructure 102. For example, tenant $\mathbf{2010}_1$ is depicted as having an on-premises infrastructure $\mathbf{102}_1$, tenant $\mathbf{2010}_2$ is depicted as having an on-premises infrastructure $\mathbf{102}_2$, and tenant $\mathbf{2010}_n$ is depicted as having an on-premises infrastructure $\mathbf{102}_n$. Additionally, at least one of the tenants $\mathbf{2010}_1$, $\mathbf{2010}_2$ . . . $\mathbf{2010}_n$ can have a cloud-based infrastructure 104. For example, tenant $\mathbf{2010}_2$ is depicted as having a cloud-based infrastructure $\mathbf{104}_2$, and tenant $\mathbf{2010}_n$ is depicted as having a cloud-based infrastructure $\mathbf{104}_n$. The on-premises infrastructures 102 can have at least one on-premises log source 112 (e.g., on-premises infrastructure $\mathbf{102}_1$ has an on-premises log source $\mathbf{112}_1$, on-premises infrastructure $\mathbf{102}_2$ has an on-premises log source $\mathbf{112}_2$, and on-premises infrastructure 102, has an on-premises log source $\mathbf{112}_n$). The cloud-based infrastructures 104 can have at least one cloud-based log source 114 (e.g., cloud-based infrastructure $\mathbf{104}_2$ has a cloud-based log source $\mathbf{114}_2$, and cloud-based infrastructure $\mathbf{104}_n$ has a cloud-based log source $\mathbf{114}_n$). On-premises data logs 112 may be generated by various on-premises data logging tools such as, for example, SysLog forwarding, Windows Event forwarding, Filebeat forwarding, Splunk Universal Forwarder and/or other commercial available software for data logging and forwarding. The cloud based infrastructures 104 may comprise various cloud-based data services, such as, for example, Amazon Web Services (AWS), Microsoft 365, Okta, or other cloud-based data services. Thus, the cloud-based data logs 114 may be generated from data that is collected and/or aggregated on these various cloud-based data services. The log sources 112, 114 can generate data comprising plurality of different content types and/or format types. The data generated by log sources 112, 114 is sometimes referred to herein as "raw" data. Although only three different combinations of on-premises and cloud-based infrastructures are expressly shown in FIG. 2, one of ordinary skill in the art will understand that tenants $\mathbf{2010}_1$, $\mathbf{2010}_2$ . . . $\mathbf{2010}_n$ can have any one of a vast number of combinations on-premises and cloud-based infrastructures 102, 104, each infrastructure 102, 104 having any one or more of several of different types of log sources 112, 114.

Still referring to FIG. 2, the SIEM provider server 2002 can comprise a central control plane module 200. The central control plane module 200 can be configured to generate a plurality of data gateway modules 210, 212. Each of the plurality of data gateway modules 210, 212 can be associated with a different log source 112, 114. For example, data gateway module $\mathbf{210}_1$ is associated with on-premises log source $\mathbf{112}_1$, data gateway module $\mathbf{210}_2$ is associated with on-premises log source $\mathbf{112}_2$, data gateway module $\mathbf{212}_2$ is associated with cloud-based log source $\mathbf{114}_2$, data gateway module $\mathbf{210}_n$ is associated with on-premises log source $\mathbf{112}_n$, and data gateway module $\mathbf{212}_n$ is associated with cloud-based log source $\mathbf{114}_n$. Each of the plurality of data gateway modules 210, 212 can be configured to receive raw log data from the log source 112, 114 associated therewith. Each of the plurality of data gateway modules 210, 212 can further be configured generate formatted log data from the raw log data that it receives. For example, each data gateway module can be configured to filter the raw log data to only include fields that are determined to be relevant for SIEM detection. As another example, each data gateway module can be configured to normalize and/or parse the raw log data based on a standard schema (i.e. standard format). The raw log data can be formatted by the data gateway modules 210, 212 such that the formatted log data can be processed (i.e. analyzed) by a SIEM detection engine.

Each of the plurality of data gateway modules 210, 212 can also be configured to route the formatted log data based on SIEM and tenant data requirements. For example, in some aspects, a data gateway module 210, 212 can be configured to route formatted log data to an edge module 220 that is hosted on the SIEM provider server. The edge module 220 can be configured to ingest the formatted log data at high volume, velocity, and/or verbosity. This ingested, formatted data can then be processed (i.e., analyzed) by a SIEM detection engine 230 hosted on SIEM provider server 2002. Additionally, in some aspects, a data gateway module 210, 212 can be configured to route formatted log data to a SIEM detection engine 260 hosted on a third-party network 250. Yet further, in some aspects, a data gateway module 210, 212 can be configured to route raw data to tenant storage 120. Tenant storage 120, can be, for example, a compliance archival comprising low-cost, immutable storage. Depending on tenant needs and/or preferences, the tenant storage 120 can be hosted by the SIEM provider server 2002 (e.g., tenant storage $\mathbf{120}_1$), the tenant storage 120 can be hosted in the tenant's cloud based infrastructure 104 (e.g., tenant storage $\mathbf{120}_2$, $\mathbf{120}_n$), or the tenant storage can be hosted on a server that is not related to the SIEM provider server 2002 or the tenant's cloud based infrastructure 104.

Still referring to FIG. 2, the central control plane module 200 can be configured to implement a variety of actions based on changes to the SIEM detection engine 230, 260 and/or based on changes related to data logs 112, 114. For example, the central control plane module 200 can be configured to automatically update the configuration of one or more data gateway modules 210, 212 in response to a change (e.g., update) to the log source(s) associated with the one or more data gateway modules 210, 212. In various aspects, the central control plane module 200 can be configured simultaneously update the configuration of a plurality of gateway modules 210, 212 based on a common change to the log sources 112, 114 associated therewith. For example, a particular type of log source may undergo a system-wide update. In response, the central control plane module 200 can update any gateway module 210, 212, that is receiving raw log data from the particular type of log source that was updated (e.g., a firewall-related update).

In various aspects, the central control plane 200 can be configured to update the configuration of a data gateway module 210, 212 that requires a non-standard configuration based on an exception related to the log source 112, 114 that it receives data from. For example, this type of local change can be implemented where a type of log source 112, 114 may be common to several tenants 2010, but, only one instance of that type of log source 112 (or 114) at a specific tenant 2010 necessitates an update to its associated data gateway module 210 (or 212). This local-only change allows that specific data gateway module 210 (or 212) to be updated without implementing a global update that would impact all data gateway modules 210, 212 that receive raw log data from the same type of log source 112, 114. Thus, the central control plane module 200 can generate both automatic, system-wide configuration updates of data gateway modules 210, 2102 and local-only data gateway module 210, 212 configuration updates.

In various aspects, the central control plane module 200 can be configured to generate a new data gateway module 210, 212. For example, a new tenant 2010 may be added to system 2000. The central control plane module 200 can cause the generation of new data gateway modules 210, 212 for every log source 112, 114 within the new tenant 2010 network. As another example, an existing tenant 2010 may update its network to add a new log source 112, 114. The central control plane module 200 can cause the generation of a new gateway module 210, 212 for the new log source 112, 114.

In various aspects, the central control plane module 200 can allow for the triaging of health-related information of system 2000. For example, central control plane module 200 can detect and/or identify a log source 112, 114 that is no longer sending raw log data. The central control plane module 200 may implement an action, such as issuing an alert, in response to detecting such health-related information. In various aspects, the central control plane module 200 can be configured to remove a data gateway module 210, 212. For example, a tenant 2010 may be removed from the system 2000 and the associated data gateway modules 210, 212 may be removed by the central control plane module 200. As another example, a tenant 2010 may update its network and remove one or more log sources 112, 114. The central control plane module 200 can be configured to remove the data gateway modules 210, 212 that are associated with the one or more log sources 112, 114 that have been removed.

In various aspects, the central control plane module 200 can be configured to updated the configuration of the plurality of data gateway modules based 210, 212 based on SIEM detection engine 230, 260 requirements. For example, the SIEM detection engine 230, 260 may undergo an update that requires a change to how the raw data is formatted (e.g., filtered, normalized, and/or parsed). In response to this update, the central control plane module 200 can cause a corresponding configuration change across the plurality of data gateway modules based 210, 212 to ensure that the raw data is correctly formatted. This may be an automated system-wide update. As another example, it may be determined that the raw data needs to be filtered differently (e.g., based on an update to what is considered to be a relevant security field that needs to be monitored). In response to this update, the central control plane module 200 can cause a corresponding configuration change across the plurality of data gateway modules 210, 212 to ensure that the raw data is correctly filtered. This may be an automated system-wide update. Thus, central control plane module 200 can serve as a single point from which all data log sources 112, 114 can be managed based on the provisioning and updating of the plurality of data gateway modules 210, 212.

In various aspects, the central control plane module 200 can be configured from software components comprising an infrastructure orchestration system, a graphical user interface (GUI) for pre-processing software configuration management, and a cloud infrastructure hosting environment. The infrastructure orchestration system can be, for example, a software component such as Chef, Puppet, Ansible, etc. The cloud infrastructure hosting environment can be a commercially available hosting environment, such as, for example, AWS, Google Cloud Platform, Azure, etc. In various aspects, the SIEM provider server 2002 can be a cloud infrastructure hosting environment.

In various aspects, the one or more edge module 220 can be configured from software components such as a cloud infrastructure hosting environment, pre-processing software, and an infrastructure orchestration system. The cloud infrastructure hosting environment can be a commercially available hosting environment, such as, for example, AWS, Google Cloud Platform, Azure, etc. In various aspects, the SIEM provider server 2002 can be a cloud infrastructure hosting environment. The pre-processing software can be, for example, commercial software, or open source software (e.g., Crbl, FluentD, Kafka, Logstash, etc.). The infrastructure orchestration system can be, for example, a software component such as Chef, Puppet, Ansible, etc. Referring still to the non-limiting aspect of FIG. 2, the central control plane module 200 is shown as being hosted on edge module 220. In other aspects, the central control plane module 200 may be abstracted away into its own hosting environment.

In various aspects, the data gateway modules 210 that are associated with on-premises log sources 112 can be configured using a virtual private network (VPN) connection with the tenant's 2010 on-premises infrastructure 102. The data gateway modules 212 that are associated with cloud-based log sources 114 can be configured using an application programming interface (API), such as a cloud-based RESTful API, to extract data from the tenant's 2010 cloud-based infrastructure 104. Each data gateway module 210, 212 can generally be configured from software components such as an edge device and pre-processing software. The edge device software component can be, for example, a virtual or physical host server, a par of such hosts for high availability, or a virtual or physical cluster of host nodes using container technology (e.g., Kubernetes, etc.). The pre-processing software can be, for example, commercial software, or open source software (e.g., Crbl, FluentD, Kafka, Logstash, etc.).

In various aspects, the data gateway modules 212 that are associated with cloud-based log sources can be configured as "cloud-native collector" data gateway modules. For example, a cloud-native collector data gateway module can be resident within a tenant 2010 cloud-based infrastructure 104 (e.g., Azure Tenant, AWS, etc.). The cloud-native collector data gateway module can be configured to natively process and ingest cloud-native data. Additionally, the cloud-native collector data gateway module may be generated with by automated cloud-native collector deployment package that can remain resident on the tenant 2010 cloud-based infrastructure 104 and establish connectivity to both cloud-native data log sources and formatted and raw log data destinations (e.g. SIEM 260). The direct connectivity enabled by cloud-native collector data gateway modules can ensure high availability of continuous data flow, and can allow for the ingestion of data at higher velocity and volume, and of more variety, and compared to traditional SIEM data ingestion methods.

Still referring to FIG. 2, the system 2000 can be configured to allow for co-management between tenants $\mathbf{2010}_1$, $\mathbf{2010}_2$ . . . $\mathbf{2010}_n$ and an MSSP contracting with the tenants to provide cyber security servers. For example, one or more tenants 2010 may desire visibility over data collected by data gateway modules 210, 212. In such cases, the one or more tenants 2010 can be provided with read-only and/or full access over one or more data gateway modules 210, 212. This can enable the one or more tenants 2010 to have both visibility and shared control over data generated by log sources 112, 114 and/or data gateway modules 210, 212. As another example, one or more tenants 2010 may be concerned that their data flows will "break" (e.g., stop flowing to a system in a way in which the system is unable to process the data). In such cases, the one or more tenants 2010 can be given access to maintain a common system with the MSSP to control their data processing need. This can be implemented by, for example, providing the one or more tenants 2010 with access to control the routing and/or processing of raw data by the relevant data gateway modules 210, 212. The co-management features described herein may allow for the MSSP and tenants $\mathbf{2010}_1$, $\mathbf{2010}_2$ . . . $\mathbf{2010}_n$ to maintain control over their respective data processing needs, ensuring the correct processing and routing of data for all parties.

The non-routine combination of the central control plane module 200, the data gateway modules 210, 212, and the edge module 220 allow for a system 2000 that streamlines and standardizes the ingestion of log data across a plurality of tenants $\mathbf{2010}_1$, $\mathbf{2010}_2$ . . . $\mathbf{2010}_n$. This non-routine combination allows for a system 2000 that can adapt to the vast number of combinations of on-premises and cloud-based infrastructures 102, 104 that a tenant 2010 may employ—including adapting to the several of different types of log sources 112, 114 that may be employed within the on-premises and cloud-based infrastructures 102, 104. This non-routine combination also allows for the remote processing and routing of raw log data from within the tenant 2010 environment. For example, from within the tenant 2010 environment, raw log data intended for compliance archival (e.g., tenant storage 120 can be a compliance archive) can be routed to low-cost, immutable storage while a copy of this data is filtered down to the relevant security fields, normalized to a common schema that allows security alerts to be detected, and routed to a SIEM detection engine (e.g. SIEM 230, 260). This non-routine combination also allows for flexibility depending on different system architectures—the SIEM detection engine (e.g. SIEM 230, 260) and compliance archives (e.g., tenant storage 120) can by hosted by any combination of a tenant 2010 network, a third-party vendor, or the SIEM provider server 2002. Moreover, this non-routine combination allows for a centralized management of data ingestion from hundreds of thousands of data sources within different environments—by generating and updating the data gateway modules 210, 212, the central control plane module 200 can simultaneously ensure that data flow from log sources 112, 114 remains consistent across a plurality (e.g., tens, hundreds, thousands, etc.) of tenants $\mathbf{2010}_1$, $\mathbf{2010}_2$ . . . $\mathbf{2010}_n$ with varying network architectures.

Yet further, the non-routine combination of the central control plane module 200, the data gateway modules 210, 212, and the edge module 220 performs operations that could not be practically performed by the human mind and improves the performance of the SIEM detection engine 230, 260. For example, this non-routine combination allows for the ability to propagate changes in data structure or data tags using an automated process (i.e., control plane module 200 generating automated configuration updates to data gateway modules 210, 212 that affect raw log data processing), removing human labor and risk of error. Moreover, in the cyber security industry, most data ingestion is manually configured on a case-by-case (i.e., tenant-by-tenant) basis, with no ability to take advantages of the common aspects of tenant networks. This non-routine combination improves SIEM performance by allowing for a streamlined and standardized the ingestion of log data across a plurality of tenants $\mathbf{2010}_1$, $\mathbf{2010}_2$ . . . $\mathbf{2010}_n$ having various combinations of on-premises and cloud-based log sources 112, 114.

Figure 3:
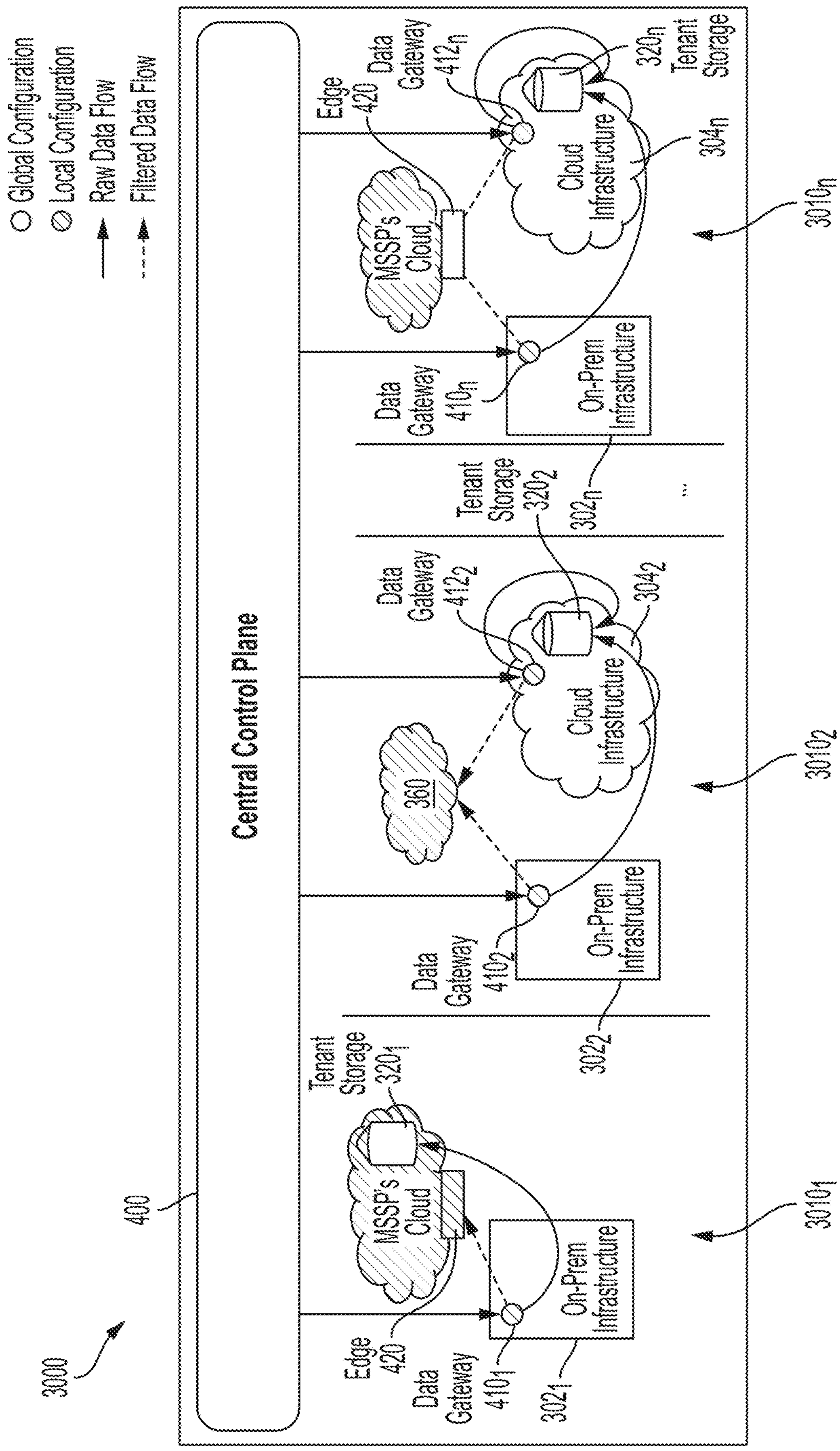
FIG. 3 illustrates a diagram of a system configured to streamline and standardize the ingest of log data across multiple tenants, in accordance with at least one non-limiting aspect of the present disclosure.

Referring now to FIG. 3, a diagram of a system 3000 configured to streamline and standardize the ingest of log data across multiple tenants is illustrated, in accordance with at least one non-limiting aspect of the present disclosure. The system can comprise a plurality of tenants $\mathbf{3010}_1$, $\mathbf{3010}_2$, . . . $\mathbf{3010}_n$, each of the plurality having various combinations of on-premises infrastructures 302 and cloud-based infrastructures 304. The system 3000 can also comprise tenant storage 320. For example, tenant storage $\mathbf{320}_1$ associated with tenant $\mathbf{3010}_1$ can be hosted by can be hosted by an MSSP's cloud (e.g., an SIEM provider server), tenant storage $\mathbf{320}_2$ associated with tenant $\mathbf{3010}_2$ can be hosted by the cloud-based infrastructure $\mathbf{304}_2$ of the tenant $\mathbf{3010}_2$, and tenant storage $\mathbf{320}_n$ associated with tenant $\mathbf{3010}_n$ can be hosted by the cloud-based infrastructure $\mathbf{304}_n$ of the tenant $\mathbf{3010}_n$. The plurality of tenants $\mathbf{3010}_1$, $\mathbf{3010}_2$, . . . $\mathbf{3010}_n$; on-premises infrastructures $\mathbf{302}_1$, $\mathbf{302}_2$, . . . $\mathbf{302}_n$; cloud-based infrastructures $\mathbf{304}_2$, . . . $\mathbf{304}_n$; and tenant storage $\mathbf{320}_1$, $\mathbf{320}_2$, . . . $\mathbf{320}_n$ can be configured the same as or similar to the plurality of tenants $\mathbf{2010}_1$, $\mathbf{2010}_2$, . . . $\mathbf{2010}_n$; on-premises infrastructures $\mathbf{102}_1$, $\mathbf{102}_2$, . . . $\mathbf{102}_n$; cloud-based infrastructures $\mathbf{104}_2$, . . . $\mathbf{104}_n$; and tenant storage $\mathbf{120}_1$, $\mathbf{120}_2$, . . . $\mathbf{120}_n$ of FIG. 2.

Still referring to FIG. 3, the system 3000 can comprise a central control plane module 400, a plurality of data gateway modules 410, 412, and one or more edge modules 420. The system 3000 can also comprise a SIEM detection engine 360. The central control plane module 400; the plurality of data gateway modules $\mathbf{410}_1$, $\mathbf{410}_2$, $\mathbf{412}_2$, . . . $\mathbf{410}_n$, $\mathbf{412}_n$; the one or more edge modules 420; and the SIEM detection engine 360 can be the same as or similar to the central control plane module 200; the plurality of data gateway modules $\mathbf{210}_1$, $\mathbf{210}_2$, $\mathbf{212}_2$, . . . $\mathbf{210}_n$, $\mathbf{212}_n$; the edge modules 220; and the SIEM detection engine 260 of FIG. 2. Thus, the features and benefits described above with respect to the system 2000 of FIG. 2 can similarly apply to the system 3000 of FIG. 3.

Figure 4A:
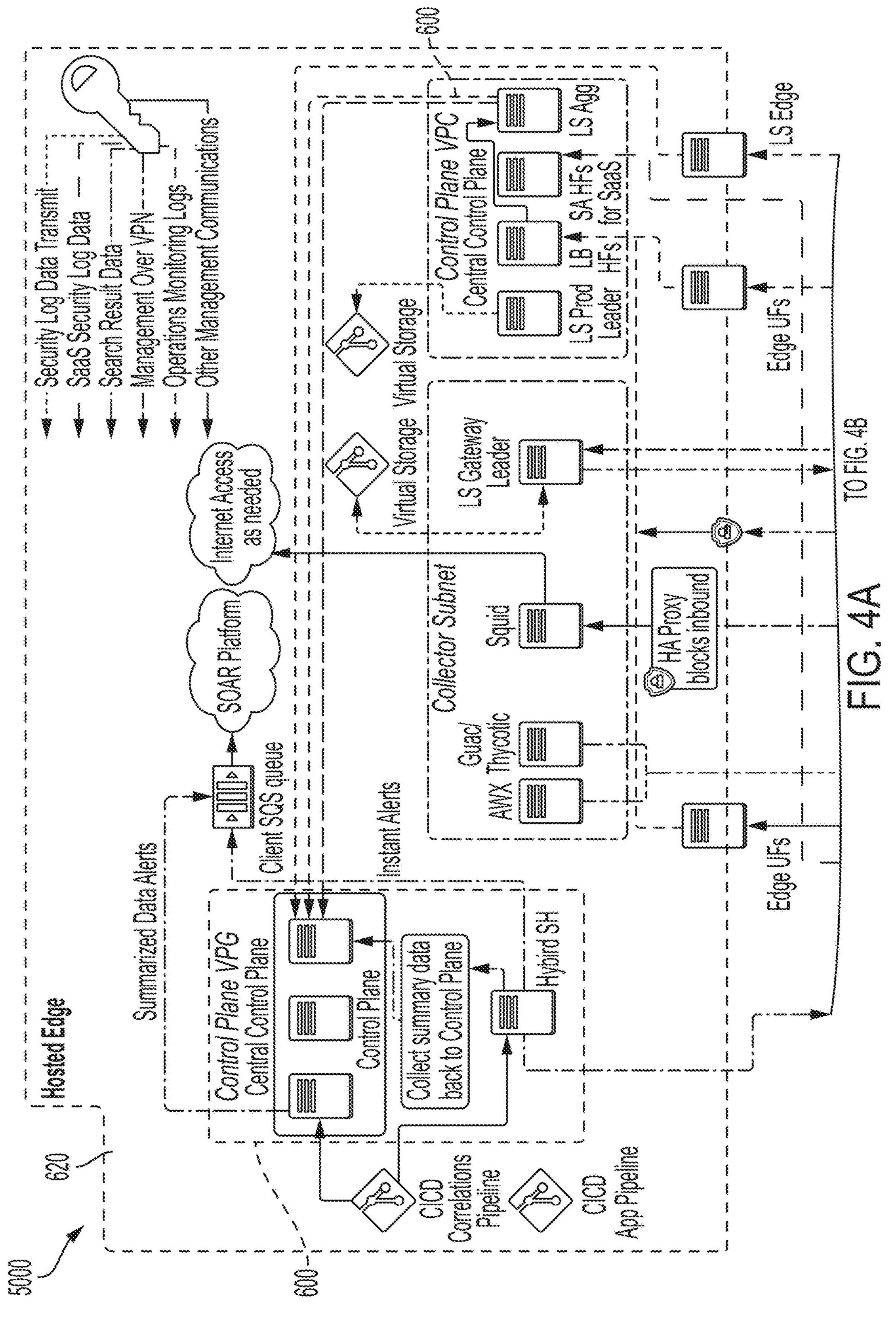
FIGS. 4A-4B illustrate a diagram of a system configured to streamline and standardize the ingest of log data for an exemplary tenant network, in accordance with at least one non-limiting aspect of the present disclosure.
Figure 4B:
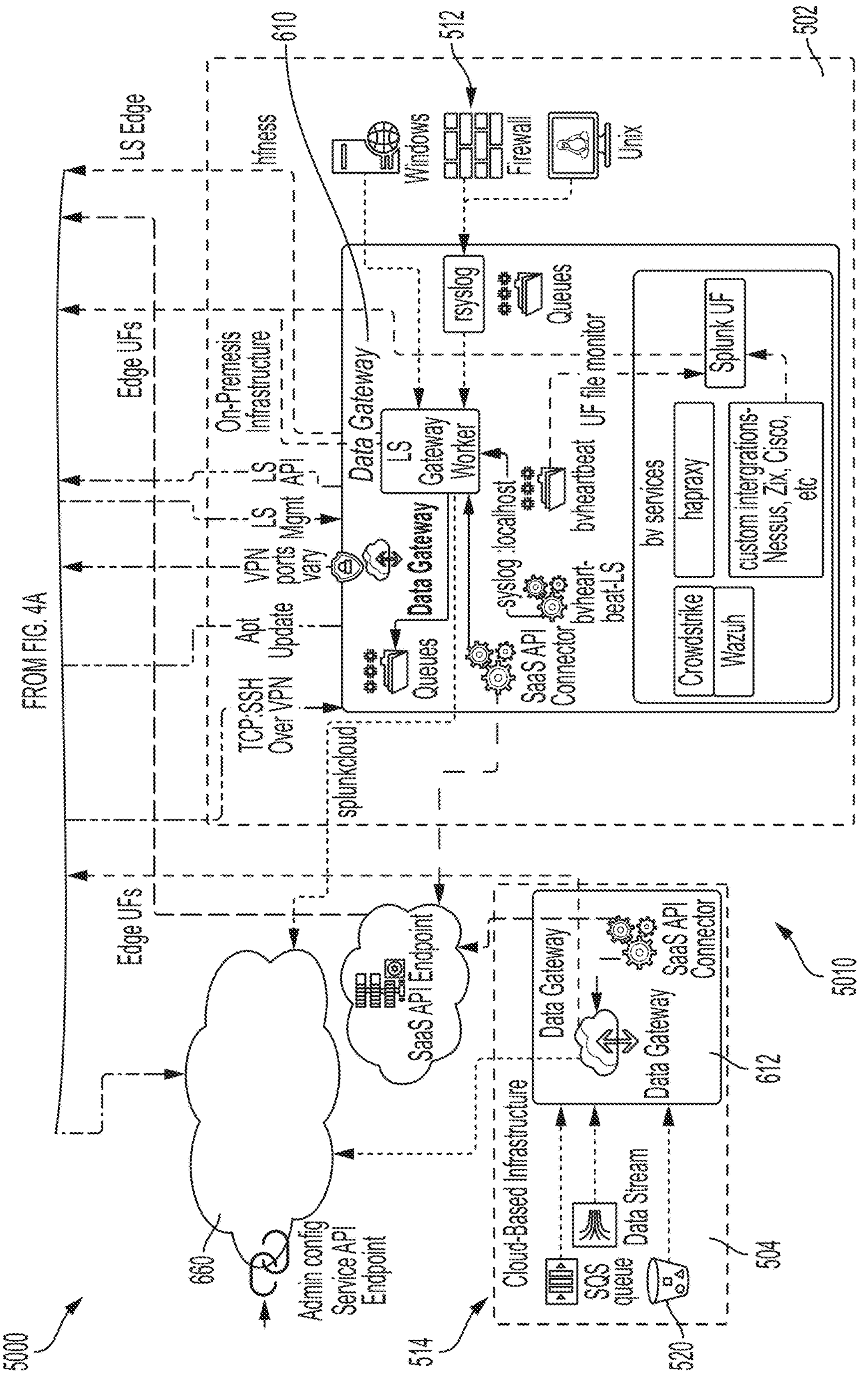

Referring now to FIGS. 4A-4B, a diagram of a system 5000 configured to streamline and standardize the ingest of log data for an example tenant 5010 network is illustrated, in accordance with at least one non-limiting aspect of the present disclosure. Referring primarily to FIG. 4B, the tenant 5010 network can comprise an on-premises infrastructure 502 and a cloud-based infrastructure 504. The on-premises infrastructure 502 can comprise on or more on-premises log sources 512. Similarly, the cloud-based infrastructure 504 can comprise on or more cloud-based log sources 514. The system 5000 can also comprise tenant storage 520. The tenant 5010; on-premises infrastructure 502; on-premises log sources 512; cloud-based infrastructure 504; cloud-based log sources 514; and tenant storage 520 can be configured the same as or similar to any of the plurality of tenants $\mathbf{2010}_1$, $\mathbf{2010}_2$, . . . $\mathbf{2010}_n$; on-premises infrastructures $\mathbf{102}_1$, $\mathbf{102}_2$, . . . $\mathbf{102}_n$; on-premises log sources $\mathbf{112}_1$, $\mathbf{112}_2$, . . . $\mathbf{112}_n$; cloud-based infrastructures $\mathbf{104}_2$, . . . $\mathbf{104}_n$; cloud-based log sources $\mathbf{114}_2$, . . . $\mathbf{114}_n$; and tenant storage $\mathbf{120}_1$, $\mathbf{120}_2$, . . . $\mathbf{120}_n$ of FIG. 2.

Still referring to FIGS. 4A-4B, the system 5000 can comprise one or more central control plane module 600, data gateway modules 610, 612, and edge module 620. The system 5000 can also comprise a SIEM detection engine 660. The one or more central control plane modules 600; the data gateway modules 610, 612; the edge module 620; and the SIEM detection engine 660 can be the same as or similar to any of the central control plane module 200; the plurality of data gateway modules $\mathbf{210}_1$, $\mathbf{210}_2$, $\mathbf{212}_2$, . . . $\mathbf{210}_n$, $\mathbf{212}_n$; edge module 220; and the SIEM detection engine 260 of FIG. 2. Thus, the features and benefits described above with respect to the system 2000 of FIG. 2 can similarly apply to the system 5000 of FIGS. 4A-4B. Additionally, any of the detailed features shown in FIGS. 4A-4B, such as, for example, features within the tenant 5010 network, the on-premises infrastructure 502, the cloud-based infrastructure 504, the central control planes 600, the data gateways 610, 612, the edge module 620, the SIEM detection engine 660, and any other components, or data streams, can be incorporated into system 1000 of FIG. 1, system 2000 of FIG. 2, and/or system 3000 of FIG. 3.

Figure 5:
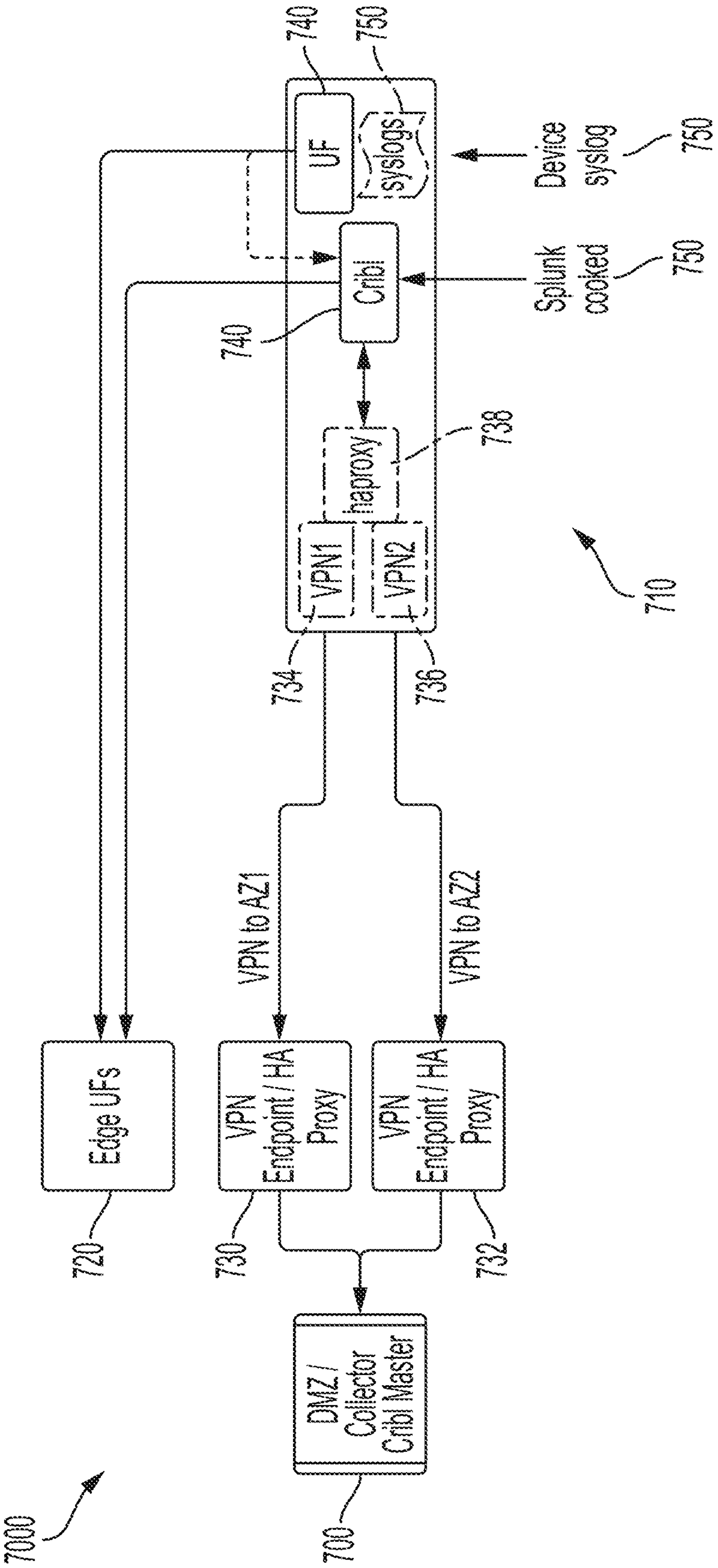
FIG. 5 illustrates a diagram of an exemplary subsystem architecture comprising a data gateway module configured to receive, process, and route log data from one or more on-premises log sources, in accordance with at least one non-limiting aspect of the present disclosure.

Referring now to FIG. 5, a diagram of an exemplary subsystem 7000 architecture comprising a data gateway module 710 configured to receive, process, and route log data from one or more on-premises log sources 750 is illustrated, in accordance with at least one non-limiting aspect of the present disclosure. The subsystem 7000 can comprise a central control plane module 700, a data gateway module 710, and an edge module 720. The data gateway module 710 can be located within a tenant's on-premises infrastructure (e.g., a tenant 1010 on-premises infrastructure 102 as shown in FIG. 2) or in cloud infrastructure managed by the tenant. The central control plane module 700 and edge module 720 can be hosted on a computing resource owned or leased by an MSSP (e.g., SIEM provider server 2002 of FIG. 2). The central control plane module 700 can be configured to generate the data gateway module 710. To execute this, the central control plane module 700 can be configured to generate VPN endpoint modules 730, 732, 734, and 736 to establish a connection with the tenant's infrastructure. A load balancing module 738 can also be generated at data gateway module 710 to improve speed and performance of the connection between the central control plane module 700 and the data gateway module 710.

Still referring to FIG. 5, the data gateway module 710 can comprise one or more data processing and routing modules 740. The data processing and routing modules 740 can be configured to received raw log data from one or more on-premises log sources 750, process (e.g., filter, normalize, and/or parse) the raw log data to formatted log data, and route the formatted log data to the edge module 720 for ingestion. The central control plane module 700, data gateway module 710, edge module 720, and on-premises log sources 750 can be the same or similar to the central control plane module 200, data gateway modules 210, edge module 220 and on-premises log sources 112 of FIG. 2. Additionally, any of the detailed features shown in FIG. 5, such as, for example, features of the central control plane module 700, the data gateway module 710, the edge module 720, and any other components, modules, and data streams, can be incorporated into system 1000 of FIG. 1, system 2000 of FIG. 2, and/or system 3000 of FIG. 3.

Figure 6:
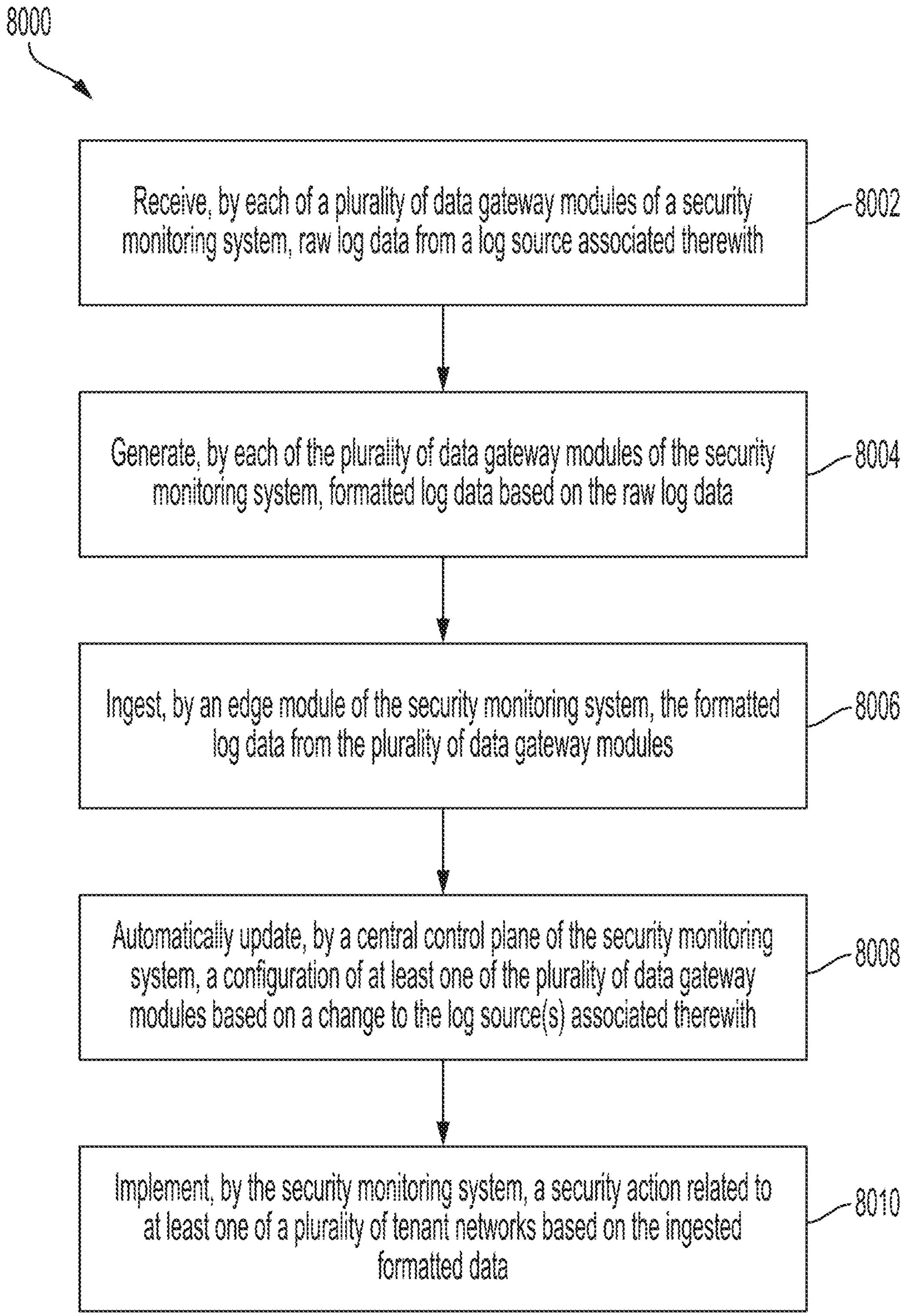
FIG. 6 illustrates a method for streamlining and standardizing the ingest of security data across a plurality of tenant networks, in accordance with at least one non-limiting aspect of the present disclosure.

FIG. 6 illustrates a method 8000 for streamlining and standardizing the ingest of data in a Security Information and Event Management 1000 (SIEM) system across a plurality of tenant networks as described in FIG. 1 hereinabove, in accordance with several non-limiting aspect of the present disclosure. The method 8000 may be practiced by the systems 2000, 3000, 5000 described in connection with FIGS. 2-4 described hereinabove, which may be implemented in accordance with the exemplary subsystem 7000 architecture described hereinabove in connection with FIG. 5.

With reference now primarily to FIG. 6 and also to FIGS. 1-5, in one aspect, in accordance with the method 8000, the security monitoring system 2000 comprises a plurality of data gateway modules 210, 212, each of the plurality of data gateway modules 210, 212 associated with a different log source 112, 114, an edge module 220, and a central control plane module 200, each of a plurality of tenant networks $2010_1$, $2010_2$, . . . $2010_n$ comprising at least one log source 112, 114. In accordance with the method 8000, each of the plurality of data gateway modules 210, 212 of the security monitoring system 2000 receives 8002, raw log data from the log source 112, 114 associated therewith. Each of the plurality of data gateway modules 210, 212 of the security monitoring system 2000 generates 8004 formatted log data based on the raw log data. The edge module 220 of the security monitoring system 2000 ingests 8006 formatted log data from the plurality of data gateway modules 210, 212. The central control plane module 200 of the security monitoring system 2000 automatically updates 8008 a configuration of at least one of the plurality of data gateway modules 210, 212 based on a change to the log source(s) 112, 114 associated therewith. The security monitoring system 2000 implements 8010 a security action related to at least one of the plurality of tenant networks $2010_1$, $2010_2$, . . . $2010_n$ based on the ingested formatted data.

With continued reference to FIGS. 1-6, in accordance with one aspect of the method 8000, each of the plurality of data gateway modules 210, 212 of the security monitoring system 2000 filters the raw log data to include only relevant security fields to generate the formatted log data and normalizes the raw log data based on a standard schema to generate the formatted log data. In yet another aspect, according to the method 8000 the central control plane module of the security monitoring system updates the filtering of the raw log data performed by the plurality of gateway modules 210, 212 based on an update to the relevant security fields.

With continued reference to FIGS. 1-6, in accordance with one aspect of the method 8000, each of the plurality of data gateway modules 210, 212 of the security monitoring system 2000 routes the raw log data to a tenant storage archive 120 and routes the formatted log data to a SIEM detection engine 230, 260. On another aspect of the method 8000, a SIEM provider server 2002 hosts the edge module 220 and the SIEM detection engine 230 and a tenant server 104 hosts the tenant storage archive 120. In yet another aspect, the edge module 220 is hosted by a SIEM provider server 2002, the SIEM detection engine 230 is hosted by the SIEM provider server 2002, and the tenant storage archive 120 is hosted by the SIEM provider server 2002. In yet another aspect, the SIEM detection engine 260 is hosted by a third-party server 250 and the tenant storage archive 120 is hosted by a tenant server 104. In yet another aspect, the SIEM detection engine 260 is hosted by a third-party server 250 and the tenant storage archive 120 is hosted by the third-party server 250.

With continued reference to FIGS. 1-6, in accordance with one aspect of the method 8000, the central control plane module 200 of the security monitoring system 2000 simultaneously updates a configuration of the plurality of gateway modules 210, 212 based on a common change to the log sources 112, 114 associated therewith and updates a configuration of at least one of the plurality of gateway modules 210, 212 based on an exception related to the log source(s) 112, 114 associated therewith.

With continued reference to FIGS. 1-6, in accordance with one aspect of the method 8000, the central control plane module 200 of the security monitoring system 2000 generates a new gateway module 210, 212 to be associated with a new log source 112, 114.

With continued reference to FIGS. 1-6, in accordance with one aspect of the method 8000, where at least one of the plurality of tenant networks $2010_1$, $2010_2$, . . . $2010_n$ of the security monitoring system 2000 comprises a cloud-based log source 112 and an on-premises log source 114, the cloud-based log source 114 generates raw log data and the on-premises log source 112 generates raw log data.

With continued reference to FIGS. 1-6, in accordance with one aspect of the method 8000, the edge module 220 is hosted by a SIEM provider server 2002 and the central control plane module 200 is hosted by the SIEM provider server 2002. In another aspect, the central control plane module 200 identifies a log source 112, 114 that is no longer generating raw log data.

With continued reference to FIGS. 1-6, in accordance with one aspect of the method 8000, in implementing the security action, the security monitoring system 2000 generates a security alert to be transmitted to an administrator of the at least one of the plurality of tenant networks $\mathbf{2010}_1$, $\mathbf{2010}_2$, . . . $\mathbf{2010}_n$ and in another aspect, removes access to the at least one tenant network $\mathbf{2010}_1$, $\mathbf{2010}_2$, . . . $\mathbf{2010}_n$ from one or more devices (e.g., one or more machines implementing clients 1012, 1014, 1016) configured to access the at least one tenant network $\mathbf{2010}_1$, $\mathbf{2010}_2$, . . . $\mathbf{2010}_n$.

Figure 7:
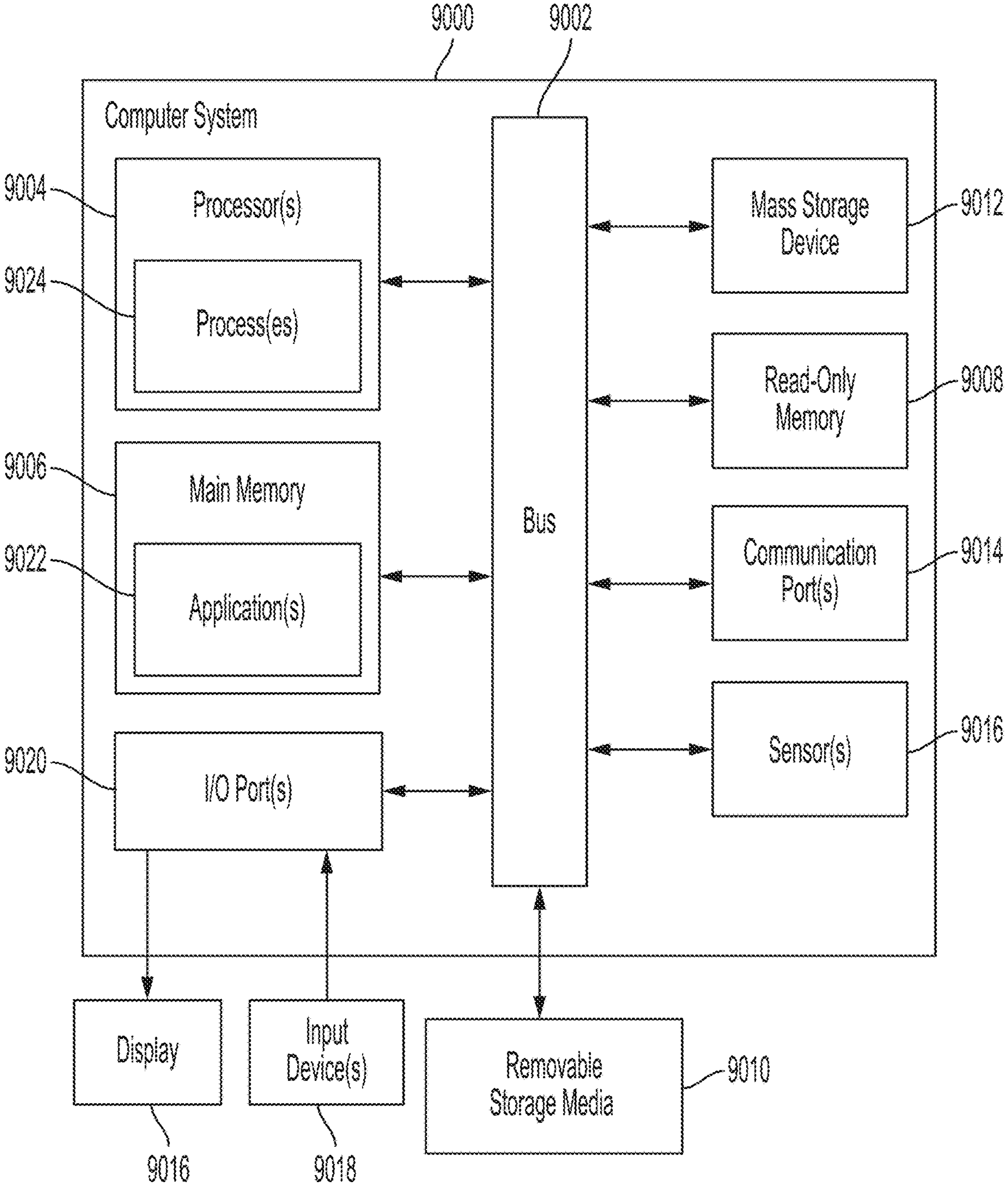
FIG. 7 illustrates a diagram of a computing system, in accordance with at least one non-limiting aspect of the present disclosure.

FIG. 7 illustrates a diagram of a computing system 9000, in accordance with at least one non-limiting aspect of the present disclosure. The computing system 9000 and the various components comprised therein, as described below, may be used to implement and/or execute any of various components the systems 2000, 3000, 5000, and 7000 described hereinabove in connection with FIGS. 2-5.

According to the non-limiting aspect of FIG. 7, the computer system 9000 may include a bus 9002 (i.e., interconnect), one or more processors 9004, a main memory 9006, read-only memory 9008, removable storage media 9010, mass storage 9012, and one or more communications ports 9014. As should be appreciated, components such as removable storage media are optional and are not necessary in all systems. Communication port 9014 may be connected to one or more networks by way of which the computer system 9000 may receive and/or transmit data.

As used herein, a "processor" can mean one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 9004 can be any known processor, such as, but not limited to, processors manufactured and/or sold by INTEL®, AMD®, MOTOROLA®, and the like, that are generally well-known to one skilled in the relevant art and are well-defined in the literature. Communications port(s) 9014 can be any of an RS-232 port for use with a modem based dial-up connection, a 10/100 Ethernet port, a Gigabit port using copper or fiber, or a USB port, and the like. Communications port(s) 9014 may be chosen depending on a network such as a Local Area Network (LAN), a Wide Area Network (WAN), a CDN, or any network to which the computer system 9000 connects. The computer system 9000 may be in communication with peripheral devices (e.g., display screen 9016, input device(s) 9018) via Input/Output (I/O) port 9020.

Main memory 9006 can be Random Access Memory (RAM), or any other dynamic storage device(s) commonly known in the art. Read-only memory 9008 can be any static storage device(s) such as Programmable Read-Only Memory (PROM) chips for storing static information such as instructions for processor 9004. Mass storage 9012 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 9002 communicatively couples processor(s) 9004 with the other memory, storage, and communications blocks. Bus 9002 can be a PCI/PCI-X, SCSI, a Universal Serial Bus (USB) based system bus (or other) depending on the storage devices used, and the like. Removable storage media 9010 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Aspects described herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, aspects described herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 9006 is encoded with application(s) 9022 that supports the functionality discussed herein (the application 9022 may be an application that provides some or all of the functionality of the CD services described herein, including the client application). Application(s) 9022 (and/or other resources as described herein) can be embodied as software code such as data and/or logic instructions (e.g., code stored in the memory or on another computer readable medium such as a disk) that supports processing functionality according to different aspects described herein.

During operation of one aspect, processor(s) 9004 accesses main memory 9006 via the use of bus 9002 in order to launch, run, execute, interpret or otherwise perform the logic instructions of the application(s) 9022. Execution of application(s) 9022 produces processing functionality of the service related to the application(s). In other words, the process(es) 9024 represent one or more portions of the application(s) 9022 performing within or upon the processor(s) 9004 in the computer system 9000.

It should be noted that, in addition to the process(es) 9024 that carries (carry) out operations as discussed herein, other aspects described herein include the application 9022 itself (i.e., the un-executed or non-performing logic instructions and/or data). The application 9022 may be stored on a computer readable medium (e.g., a repository) such as a disk or in an optical medium. According to other aspects, the application 9022 can also be stored in a memory type system such as in firmware, read only memory (ROM), or, as in this example, as executable code within the main memory 9006 (e.g., within Random Access Memory or RAM). For example, application 9022 may also be stored in removable storage media 9010, read-only memory 9008 and/or mass storage device 9012.

Those skilled in the art will understand that the computer system 9000 can include other processes and/or software and hardware components, such as an operating system that controls allocation and use of hardware resources.

Various aspects of the subject matter described herein are set out in the following numbered clauses:

Clause 1: A method for streamlining and standardizing the ingest of data in a security monitoring system across a plurality of tenant networks, the security monitoring system comprising an edge module, a central control plane module, and a plurality of data gateway modules, each of the plurality of data gateway modules associated with a different log source, each of the plurality of tenant networks comprising at least one log source, the method comprising: receiving, by each of the plurality of data gateway modules of the security monitoring system, raw log data from the log source associated therewith; generating, by each of the plurality of data gateway modules of the security monitoring system, formatted log data based on the raw log data; ingesting, by the edge module of the security monitoring system, formatted log data from the plurality of data gateway modules; automatically updating, by the central control plane module of the security monitoring system, a configuration of at least one of the plurality of data gateway modules based on a change to the log source(s) associated therewith; and implementing, by the security monitoring system, a security action related to at least one of the plurality of tenant networks based on the ingested formatted data.

Clause 2: The method of clause 1, further comprising: filtering, by each of the plurality of data gateway modules of the security monitoring system, the raw log data to include only relevant security fields to generate the formatted log data; and normalizing, by each of the plurality of data gateway modules of the security monitoring system, the raw log data based on a standard schema to generate the formatted log data.

Clause 3: The method of any of clauses 1-2, further comprising: updating, by the central control plane module of the security monitoring system, the filtering of the raw log data performed by the plurality of gateway modules based on an update to the relevant security fields.

Clause 4: The method of any of clauses 1-3, further comprising: routing, by each of the plurality of data gateway modules of the security monitoring system, the raw log data to a tenant storage archive; and routing, by each of the plurality of data gateway modules of the security monitoring system, the formatted log data to a SIEM detection engine.

Clause 5: The method of any of clauses 1-4, further comprising: hosting the edge module by a SIEM provider server; hosting the SIEM detection engine by the SIEM provider server; and hosting the tenant storage archive by a tenant server.

Clause 6: The method of any of clauses 1-5, further comprising: hosting the edge module by a SIEM provider server; hosting the SIEM detection engine by the SIEM provider server, and hosting the tenant storage archive by the SIEM provider server.

Clause 7: The method of any of clauses 1-6, further comprising: hosting the SIEM detection engine by a third party server; hosting the edge module by the third party server; and hosting the tenant storage archive by the tenant server.

Clause 8: The method of any of clauses 1-7, further comprising: hosting the SIEM detection engine by a third-party server; and hosting the tenant storage system by the third-party server.

Clause 9: The method of any of clauses 1-8, further comprising: simultaneously updating, by the central control plane module of the security monitoring system, a configuration of the plurality of gateway modules based on a common change to the log sources associated therewith; and updating, by the central control plane module of the security monitoring system, a configuration of at least one of the plurality of gateway modules based on an exception related to the log source(s) associated therewith.

Clause 10: The method of any of clauses 1-9, further comprising: generating, by the central control plane module of the security monitoring system, a new gateway module to be associated with a new log source.

Clause 11: The method of any of clauses 1-10, wherein at least one of the plurality of tenant networks of the security monitoring system comprises a cloud-based log source and an on-premises log source, the method further comprising: generating the raw log data by the cloud-based log source; and generating the raw log data by the on-premises log source.

Clause 12: The method of any of clauses 1-11, further comprising: hosting the edge module by a SIEM provider server; and hosting the central control plane module by the SIEM provider server.

Clause 13: The method of any of clauses 1-12, further comprising: identifying, by the central control plane module, a log source that is no longer generating raw log data.

Clause 14: The method of any of clauses 1-13, wherein implementing the security action comprises generating a security alert to be transmitted to an administrator of the at least one tenant network.

Clause 15: The method of any of clauses 1-14, wherein implementing the security action comprises removing access to the at least one tenant network from one or more devices configured to access the at least one tenant network.

Clause 16: A security monitoring system capable of streamlining and standardizing the ingest of data across a plurality of tenant networks, each of the plurality of tenant networks comprising at least one log source, the security monitoring system comprising: a plurality of data gateway modules, each of the plurality of data gateway modules associated with a different log source, each of the plurality of data gateway modules configured to: receive raw log data from the log source associated therewith; and generate formatted log data based on the raw log data; an edge module configured to: ingest the formatted log data from the plurality of data gateway modules; and a central control plane module configured to: automatically update the configuration of at least one of the plurality of gateway modules in response to a change to the log source(s) associated therewith; wherein the security monitoring system is configured to implement a security action related to at least one of the plurality of tenant networks based on the ingested formatted data.

Clause 17: The system of clause 16 wherein each of the plurality of data gateway modules is configured to: filter the raw log data to include only relevant security fields to generate the formatted log data; and normalize the raw data based on a standard schema to generate the formatted log data.

Clause 18: The system of any of clauses 16-17 wherein the central control plane module is configured update the configuration of the plurality of gateway modules to update the filtration of the raw log data based on an update to the relevant security fields.

Clause 19: The system of any of clauses 16-18 wherein at least one of the plurality of data gateway modules is configured to: route the raw log data to a tenant storage archive; and route the formatted log data to a SIEM detection engine.

Clause 20: The system of any of clauses 16-19 wherein the edge module is hosted by a SIEM provider server, wherein the SIEM detection engine is hosted by the SIEM provider server, and wherein the tenant storage archive is hosted by a tenant server.

Clause 21: The system of any of clauses 16-20 wherein the edge module is hosted by a SIEM provider server, wherein the SIEM detection engine is hosted by the SIEM provider server, and wherein the tenant storage archive is hosted by the SIEM provider server.

Clause 22: The system of any of clauses 16-21 wherein the SIEM detection engine is hosted by a third-party server, wherein the edge module is hosted by the third-party server, and wherein the tenant storage archive is hosted by a tenant server.

Clause 23: The system of any of clauses 16-22 wherein the SIEM detection engine is hosted by a third-party server, and wherein the tenant storage archive is hosted by the third-party server.

Clause 24: The system of any of clauses 16-23 wherein the central control plane module is configured to: simultaneously update the configuration of the plurality of gateway modules based on a common change to the log sources associated therewith; and update the configuration of at least one of the plurality of gateway modules based on an exception related to the log source(s) associated therewith.

Clause 25: The system of any of clauses 16-24 wherein the central control plane module is configured to generate a new gateway module to be associated with a new log source.

Clause 26: The system of any of clauses 16-25 wherein at least one of the plurality of tenant networks comprises a cloud-based log source and an on-premises log source.

Clause 27: The system of any of clauses 16-26 wherein the edge module is hosted by a SIEM provider server, and wherein the central control plane module is hosted by the SIEM provider server.

Clause 28: The system of any of clauses 16-27 wherein the central control plane module is configured to identify a log source that is no longer generating raw log data.

Clause 29: The system of any of clauses 16-28 wherein the security action comprises generating a security alert to be transmitted to an administrator of the at least one tenant network.

Clause 30: The system of any of clauses 16-29 wherein the security action comprises removing access to the at least one tenant network from one or more devices configured to access the at least one tenant network.

Clause 31: A system for streamlining and standardizing the ingest of security data, the system comprising: a plurality of tenant networks, each of the plurality of tenant networks comprising at least one log source; and a security monitoring subsystem comprising: a plurality of data gateway modules, each of the plurality of data gateway modules associated with a different log source, each of the plurality of data gateway modules configured to: receive raw log data from the log source associated therewith; and generate formatted log data based on the raw log data; an edge module configured to: ingest the formatted log data from the plurality of data gateway modules; and a central control plane module configured to: automatically update the configuration of at least one of the plurality of gateway modules in response to a change to the log source(s) associated therewith; wherein the security monitoring subsystem is configured to implement a security action related to at least one of the plurality of tenant networks based on the ingested formatted data.

Clause 32: The system of clause 31 wherein each of the plurality of data gateway modules is configured to: filter the raw log data to include only relevant security fields to generate the formatted log data; and normalize the raw data based on a standard schema to generate the formatted log data.

Clause 33: The system of any of clauses 31-32 wherein the central control plane module is configured update the configuration of the plurality of gateway modules to update the filtration of the raw log data based on an update to the relevant security fields.

Clause 34: The system of any of clauses 31-33 wherein at least one of the plurality of data gateway modules is configured to: route the raw log data to a tenant storage archive; and route the formatted log data to a SIEM detection engine.

Clause 35: The system of any of clauses 31-34 wherein the edge module is hosted by a SIEM provider server, wherein the SIEM detection engine is hosted by the SIEM provider server, and wherein the tenant storage archive is hosted by a tenant server.

Clause 36: The system of any of clauses 31-35 wherein the edge module is hosted by a SIEM provider server, wherein the SIEM detection engine is hosted by the SIEM provider server, and wherein the tenant storage archive is hosted by the SIEM provider server.

Clause 37: The system of any of clauses 31-38 wherein the SIEM detection engine is hosted by a third-party server, wherein the edge module is hosted by a third-party server, and wherein the tenant storage archive is hosted by a tenant server.

Clause 38: The system of any of clauses 31-39 wherein the SIEM detection engine is hosted by a third-party server, and wherein the tenant storage archive is hosted by the third-party server.

Clause 39: The system of any of clauses 31-40 wherein the central control plane module is configured to: simultaneously update the configuration of the plurality of gateway modules based on a common change to the log sources associated therewith; and update the configuration of at least one of the plurality of gateway modules based on an exception related to the log source(s) associated therewith.

Clause 40: The system of any of clauses 31-39 wherein the central control plane module is configured to generate a new gateway module to be associated with a new log source.

Clause 41: The system of any of clauses 31-40 wherein at least one of the plurality of tenant networks comprises a cloud-based log source and an on-premises log source.

Clause 42: The system of any of clauses 31-41 wherein the edge module is hosted by a SIEM provider server, and wherein the central control plane module is hosted by the SIEM provider server.

Clause 43: The system of any of clauses 31-42 wherein the central control plane module is configured to identify a log source that is no longer generating raw log data.

Clause 44: The system of any of clauses 31-43 wherein the security action comprises generating a security alert to be transmitted to an administrator of the at least one tenant network.

Clause 45: The system of any of clauses 31-44 wherein the security action comprises removing access to the at least one tenant network from one or more devices configured to access the at least one tenant network.

Clause 46: A system and method for streamlining and standardizing the ingest of data for in a Security Information, and Event Management (SIEM) across a plurality of tenant networks substantially as disclosed and described herein.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Various exemplary, and illustrative aspects have been described. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications, or combinations of any of the exemplary aspects may be made without departing from the scope of the claimed subject matter. In addition, persons skilled in the art will recognize, or be able to ascertain using no more than routine experimentation, many equivalents to the various aspects of the present disclosure upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as “open” terms (e.g., the term “including” should be interpreted as “including but not limited to,” the term “having” should be interpreted as “having at least,” the term “includes” should be interpreted as “includes but is not limited to,” etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases “at least one”, and “one or more” to introduce claim recitations. However, the use of such phrases should not be construed to imply that the introduction of a claim recitation by the indefinite articles “a” or “an” limits any particular claim containing such introduced claim recitation to claims containing only one such recitation, even when the same claim includes the introductory phrases “one or more” or “at least one”, and indefinite articles such as “a” or “an” (e.g., “a”, and/or “an” should typically be interpreted to mean “at least one” or “one or more”); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of “two recitations,” without other modifiers, typically means at least two recitations, or two or more recitations). Furthermore, in those instances where a convention analogous to “at least one of A, B, and C, etc.” is used, in general such a construction is intended in the sense one having skill in the art would understand the convention (e.g., “a system having at least one of A, B, and C” would include but not be limited to systems that have A alone, B alone, C alone, A, and B together, A, and C together, B, and C together, and/or A, B, and C together, etc.). In those instances where a convention analogous to “at least one of A, B, or C, etc.” is used, in general such a construction is intended in the sense one having skill in the art would understand the convention (e.g., “a system having at least one of A, B, or C” would include but not be limited to systems that have A alone, B alone, C alone, A, and B together, A, and C together, B, and C together, and/or A, B, and C together, etc.). It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. For example, the phrase “A or B” will be typically understood to include the possibilities of “A” or “B” or “A, and B.”

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like “responsive to,” “related to,” or other past-tense adjectives are generally not intended to exclude such variants, unless context dictates otherwise.

It is worthy to note that any reference to "one aspect," "an aspect," "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all sub-ranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification, and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material, and the existing disclosure material.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The foregoing detailed description has set forth various forms of the devices, and/or processes via the use of block diagrams, flowcharts, and/or examples. Insofar as such block diagrams, flowcharts, and/or examples contain one or more functions, and/or operations, it will be understood by those within the art that each function, and/or operation within such block diagrams, flowcharts, and/or examples can be implemented, individually, and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry, and/or writing the code for the software, and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes, and/or devices described herein, or a microprocessor configured by a computer program which at least partially carries out processes, and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer readable storage medium. Firmware may be embodied as code, instructions or instruction sets, and/or data that are hard-coded (e.g., nonvolatile) in memory devices.

As used in any aspect herein, the terms "component," "system," "module", and the like can refer to a computer-related entity, either hardware, a combination of hardware, and software, software, or software in execution.

As used in any aspect herein, an "algorithm" refers to a self-consistent sequence of steps leading to a desired result, where a "step" refers to a manipulation of physical quantities, and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These, and similar terms may be associated with the appropriate physical quantities, and are merely convenient labels applied to these quantities, and/or states.

What is claimed is:

1. A method for streamlining and standardizing the ingest of data in a security monitoring system across a plurality of tenant networks, the security monitoring system comprising an edge module, a central control plane module, and a plurality of data gateway modules, each of the plurality of data gateway modules associated with a different log source, each of the plurality of tenant networks comprising at least one log source, the method comprising:

receiving, by each of the plurality of data gateway modules of the security monitoring system, raw log data from the log source associated therewith;

generating, by each of the plurality of data gateway modules of the security monitoring system, formatted log data based on the raw log data by processing the raw log data received from the log source associated therewith, the processing comprising:

filtering the raw log data to include only security fields used for Security, Information, and Event Management (SIEM) detection to generate the formatted log data; and normalizing the raw log data based on a standard schema to generate the formatted log data;

ingesting, by the edge module of the security monitoring system, the formatted log data from the plurality of data gateway modules;

automatically updating, by the central control plane module of the security monitoring system, a configuration of at least one of the plurality of data gateway modules, wherein automatically updating the configuration of at least one of the plurality of data gateway modules comprises updating any one or more of filtering rules or normalization parameters of the at least one data gateway module, and wherein the central control plane module automatically updates the configuration of the at least one of the plurality of data gateway modules based on a change to the log source(s) associated therewith; and implementing, by the security monitoring system, a security action related to at least one of the plurality of tenant networks based on the ingested formatted data.

2. The method of claim 1, further comprising:

updating, by the central control plane module of the security monitoring system, the filtering of the raw log data performed by the plurality of gateway modules based on an update to the relevant security fields.

3. The method of claim 1, further comprising:

routing, by each of the plurality of data gateway modules of the security monitoring system, the raw log data to a tenant storage archive; and routing, by each of the plurality of data gateway modules of the security monitoring system, the formatted log data to a SIEM detection engine.

4. The method of claim 3, further comprising:

hosting the edge module by a SIEM provider server;

hosting the SIEM detection engine by the SIEM provider server; and hosting the tenant storage archive by a tenant server.

5. The method of claim 3, further comprising:

hosting the edge module by a SIEM provider server;

hosting the SIEM detection engine by the SIEM provider server, and hosting the tenant storage archive by the SIEM provider server.

6. The method of claim 3, further comprising:

hosting the SIEM detection engine by a third party server;

hosting the edge module by the third party server;

hosting the tenant storage archive by the tenant server.

7. The method of claim 3, further comprising:

hosting the SIEM detection engine by a third-party server; and hosting the tenant storage system by the third-party server.

8. The method of claim 1, further comprising:

simultaneously updating, by the central control plane module of the security monitoring system, a configuration of the plurality of gateway modules based on a common change to the log sources associated therewith; and updating, by the central control plane module of the security monitoring system, a configuration of at least one of the plurality of gateway modules based on an exception related to the log source(s) associated therewith.

9. The method of claim 1, further comprising:

generating, by the central control plane module of the security monitoring system, a new gateway module to be associated with a new log source.

10. The method of claim 1, wherein at least one of the plurality of tenant networks of the security monitoring system comprises a cloud-based log source and an on-premises log source, the method further comprising:

generating the raw log data by the cloud-based log source; and generating the raw log data by the on-premises log source.

11. The method of claim 1, further comprising:

hosting the edge module by a SIEM provider server; and hosting the central control plane module by the SIEM provider server.

12. The method of claim 1, further comprising:

identifying, by the central control plane module, a log source that is no longer generating raw log data.

13. The method of claim 1, wherein implementing the security action comprises generating a security alert to be transmitted to an administrator of the at least one tenant network.

14. The method of claim 1, wherein implementing the security action comprises removing access to the at least one tenant network from one or more devices configured to access the at least one tenant network.

15. A security monitoring system capable of streamlining and standardizing the ingest of data across a plurality of tenant networks, each of the plurality of tenant networks comprising at least one log source, the security monitoring system comprising:

a plurality of data gateway modules, each of the plurality of data gateway modules associated with a different log source, each of the plurality of data gateway modules configured to:

receive raw log data from the log source associated therewith; and generate formatted log data based on the raw log data by processing only the raw log data received from the log source associated therewith, wherein, to process the raw log data, each of the plurality of data gateway modules is configured to:

filter the raw log data to include only security fields used for Security, Information, and Event Management (SIEM) detection to generate the formatted log data; and normalize the raw log data based on a standard schema to generate the formatted log data;

an edge module configured to:

ingest the formatted log data from the plurality of data gateway modules; and a central control plane module configured to:

automatically update the configuration of at least one of the plurality of gateway modules in response to a change to the log source(s) associated therewith;

wherein the security monitoring system is configured to implement a security action related to at least one of the plurality of tenant networks based on the ingested formatted data.

16. The system of claim 15, wherein the central control plane module is configured to update the configuration of the plurality of gateway modules to update the filtration of the raw log data based on an update to the relevant security fields.

17. The system of claim 15, wherein at least one of the plurality of data gateway modules is configured to:

route the raw log data to a tenant storage archive; and route the formatted log data to a SIEM detection engine.

18. The system of claim 17, wherein the edge module is hosted by a SIEM provider server, wherein the SIEM detection engine is hosted by the SIEM provider server, and wherein the tenant storage archive is hosted by a tenant server.

19. The system of claim 17, wherein the edge module is hosted by a SIEM provider server, wherein the SIEM detection engine is hosted by the SIEM provider server, and wherein the tenant storage archive is hosted by the SIEM provider server.

20. The system of claim 17, wherein the SIEM detection engine is hosted by a third-party server, wherein the edge module is hosted by the third-party server, and wherein the tenant storage archive is hosted by a tenant server.

21. The system of claim 17, wherein the SIEM detection engine is hosted by a third-party server, and wherein the tenant storage archive is hosted by the third-party server.

22. The system of claim 15, wherein the central control plane module is configured to:

simultaneously update the configuration of the plurality of gateway modules based on a common change to the log sources associated therewith; and update the configuration of at least one of the plurality of gateway modules based on an exception related to the log source(s) associated therewith.

23. The system of claim 15, wherein the central control plane module is configured to generate a new gateway module to be associated with a new log source.

24. The system of claim 15, wherein at least one of the plurality of tenant networks comprises a cloud-based log source and an on-premises log source.

25. The system of claim 15, wherein the edge module is hosted by a SIEM provider server, and wherein the central control plane module is hosted by the SIEM provider server.

26. The system of claim 15, wherein the central control plane module is configured to identify a log source that is no longer generating raw log data.

27. The system of claim 15, wherein the security action comprises generating a security alert to be transmitted to an administrator of the at least one tenant network.

28. The system of claim 15, wherein the security action comprises removing access to the at least one tenant network from one or more devices configured to access the at least one tenant network.

29. A system for streamlining and standardizing the ingest of security data, the system comprising:

a plurality of tenant networks, each of the plurality of tenant networks comprising at least one log source; and a security monitoring subsystem comprising:

a plurality of data gateway modules, each of the plurality of data gateway modules associated with a different log source, each of the plurality of data gateway modules configured to:

receive raw log data from the log source associated therewith; and generate formatted log data based on the raw log data by processing only the raw log data received from the log source associated therewith, wherein, to process the raw log data, each of the plurality of data gateway modules is configured to:

filter the raw log data to include only security fields used for Security, Information, and Event Management (SIEM) detection to generate the formatted log data; and normalize the raw log data based on a standard schema to generate the formatted log data;

an edge module configured to:

ingest the formatted log data from the plurality of data gateway modules; and a central control plane module configured to:

automatically update the configuration of at least one of the plurality of gateway modules in response to a change to the log source(s) associated therewith;

wherein the security monitoring subsystem is configured to implement a security action related to at least one of the plurality of tenant networks based on the ingested formatted data.

* * * * *